(12) United States Patent
Feldpausch et al.

(10) Patent No.: US 6,430,882 B1
(45) Date of Patent: Aug. 13, 2002

(54) FLOOR MOUNTED UTILITY POST

(75) Inventors: Thomas G. Feldpausch, Hastings; George V. Weller, Shelbyville, both of MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/723,908

(22) Filed: Nov. 28, 2000

Related U.S. Application Data

(63) Continuation of application No. 09/342,722, filed on Jun. 29, 1999, which is a continuation-in-part of application No. 09/036,276, filed on Mar. 6, 1998, now Pat. No. 5,996,294, which is a continuation of application No. 08/063,463, filed on May 18, 1993, now Pat. No. 5,794,392.

(51) Int. Cl.⁷ .................................................. E04B 5/48
(52) U.S. Cl. .................... 52/220.7; 52/220.5; 52/220.1; 52/731.4
(58) Field of Search .................... 52/220.5, 220.1, 52/220.7, 92.3, 92.2, 712, 126.2, 126.5, 220.3, 731.5, 239, 731.4

(56) References Cited

U.S. PATENT DOCUMENTS

| 2,531,110 | A | 11/1950 | Cisler |
| 3,423,898 | A | 1/1969 | Tracy et al. |
| 3,539,138 | A | 11/1970 | Desroches |
| 3,784,042 | A | 1/1974 | Hadfield et al. |
| 3,889,044 | A | 6/1975 | Flachbarth et al. |

(List continued on next page.)

FOREIGN PATENT DOCUMENTS

| DE | 1231330 | 12/1966 |
| EP | 0067134 | 11/1982 |
| EP | 0514862 A1 | 11/1992 |
| EP | 0517938 A1 | 12/1992 |
| FR | 2647180 | 5/1990 |
| GB | 1335829 | 10/1973 |
| GB | 2190936 | 12/1987 |
| GB | 2235621 | 3/1991 |
| NO | 1909667 | 2/1965 |

OTHER PUBLICATIONS

"Network Floor" by Kyodo Electric Co. Ltd. of Tokyo, Japan, 12 pages, Mar. 1987.
"Cablefloor" by Co Design of Atlanta, Georgia, 2 pages, Nov. 1990.
"Suelos Elevados" by Sistemas TDM of Madrid, Spain, 12 pages, prior to May 30, 1995.
"Suelos Technico" by Sistemas TDM of Madrid, Spain, 8 pages, prior to May 30, 1995.
"Officeflor" by Stairfair Corporation of Charlotte, North Carolina, 1 page, prior to May 30, 1995.

(List continued on next page.)

Primary Examiner—Carl D. Friedman
Assistant Examiner—Jennifer I. Thissell
(74) Attorney, Agent, or Firm—Price, Heneveld, Cooper, Dewitt & Litton

(57) ABSTRACT

A utility distribution system for open office plans comprising a prefabricated floor construction and a utility post for distributing utilities. The prefabricated floor construction is adapted to be abuttingly supported on a building floor. The prefabricated floor construction includes a substantially hollow interior portion thereof defining at least one raceway to route at least one utility conduit therethrough and a plurality of floor tiles defining an upper surface of the floor construction. The utility post includes a floor tile shaped for installation in a prefabricated floor construction and at least one marginally positioned cutouts thereof disposed above the raceway and communicating therewith. The utility post further includes at least one vertical raceway being in communication with one of the at least one marginally positioned open foot area and a top located above the at least one vertical raceway.

22 Claims, 18 Drawing Sheets

U.S. PATENT DOCUMENTS

| | | |
|---|---|---|
| 3,909,502 A | 9/1975 | Lacan |
| 3,978,631 A | 9/1976 | Diersing |
| 4,016,357 A | 4/1977 | Abrahamsen |
| 4,040,755 A | 8/1977 | Jorgensen et al. |
| 4,065,890 A | 1/1978 | Fenner |
| 4,074,488 A | 2/1978 | Ray, III |
| 4,092,486 A | 5/1978 | Myers |
| 4,124,324 A | 11/1978 | Augis et al. |
| 4,218,579 A | 8/1980 | Joly |
| 4,220,808 A | 9/1980 | Fujita |
| 4,252,989 A | 2/1981 | Blumenthal |
| 4,257,203 A | 3/1981 | Propst et al. |
| 4,296,574 A | 10/1981 | Stephens |
| 4,353,411 A | 10/1982 | Harter et al. |
| 4,373,111 A | 2/1983 | Myers et al. |
| 4,408,543 A | 10/1983 | Griffin |
| 4,442,645 A | 4/1984 | Hiller et al. |
| 4,470,232 A | 9/1984 | Condevaux et al. |
| 4,475,322 A | 10/1984 | Russo et al. |
| 4,479,030 A | 10/1984 | Votteler et al. |
| 4,484,426 A | 11/1984 | Simms |
| 4,577,055 A | 3/1986 | Wuertz |
| 4,606,394 A | 8/1986 | Bannister |
| 4,608,066 A | 8/1986 | Cadwell, Jr. |
| 4,630,417 A | 12/1986 | Collier |
| 4,631,879 A | 12/1986 | Kobayashi et al. |
| 4,682,453 A | 7/1987 | Holmgren |
| 4,750,305 A | 6/1988 | Bastian |
| 4,771,583 A | 9/1988 | Ball et al. |
| 4,773,196 A | 9/1988 | Yoshida et al. |
| 4,863,223 A | 9/1989 | Weissenbach et al. |
| 4,883,503 A | 11/1989 | Fish |
| 4,902,852 A | 2/1990 | Wuertz |
| 5,019,672 A | 5/1991 | Fish |
| 5,052,157 A | 10/1991 | Ducroux et al. |
| 5,081,809 A | 1/1992 | Thompson |
| 5,150,554 A | 9/1992 | Quinlan, Jr. et al. |
| 5,186,337 A | 2/1993 | Foster et al. |
| 5,195,286 A | 3/1993 | DeLong et al. |
| 5,207,041 A | 5/1993 | Wills |
| 5,284,255 A | 2/1994 | Foster et al. |
| 5,378,058 A | 1/1995 | Tessmer |
| 5,417,401 A | 5/1995 | Thompson et al. |
| 5,548,086 A | 8/1996 | Greenfield et al. |
| 5,574,251 A | 11/1996 | Sevier |
| 5,618,090 A | 4/1997 | Montague et al. |
| 5,628,157 A | 5/1997 | Chen |
| 5,630,300 A | 5/1997 | Chen |
| 5,644,876 A | 7/1997 | Walker |
| 5,660,120 A | 8/1997 | Sims |
| 5,673,632 A | 10/1997 | Sykes |
| 5,675,949 A | 10/1997 | Forslund et al. |
| 5,685,113 A | 11/1997 | Reuter et al. |
| 5,697,193 A | 12/1997 | Forslund, III et al. |
| 5,784,841 A | 7/1998 | Nowell |
| 5,794,392 A | 8/1998 | Forslund, III et al. |
| 5,921,795 A | 7/1999 | Weener et al. |
| 5,996,294 A | 12/1999 | Forslund, III et al. |

OTHER PUBLICATIONS

"Introducing Access" by CTEC of Grand Rapids, Michigan, 2 pages, prior to May 30, 1995.

"Doppelboden H 16" by TSC Tek Sil Cnncepts, Incorporated of Haddonfield, New Jersey, 2 pages, prior to May 30, 1995.

"Access Flooring" by Westinghouse and DEF Industries, Inc. of Dayton, Ohio, 2 pages, prior to May 30, 1995.

"Q Floor/Taproute" by Robertson, 2 pages, prior to May 30, 1995.

"Norina Cavity–Floor . . . " by Norina Bautechnik of GmbH of Nurnberg, Germany, 2 pages, prior to May 30, 1995.

"Bravo Access Floors" by Buyline, 1 page, prior to May 30, 1995.

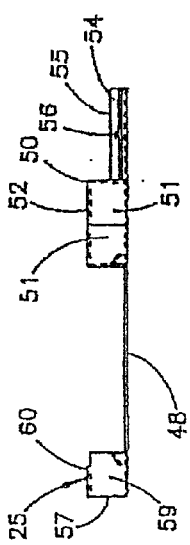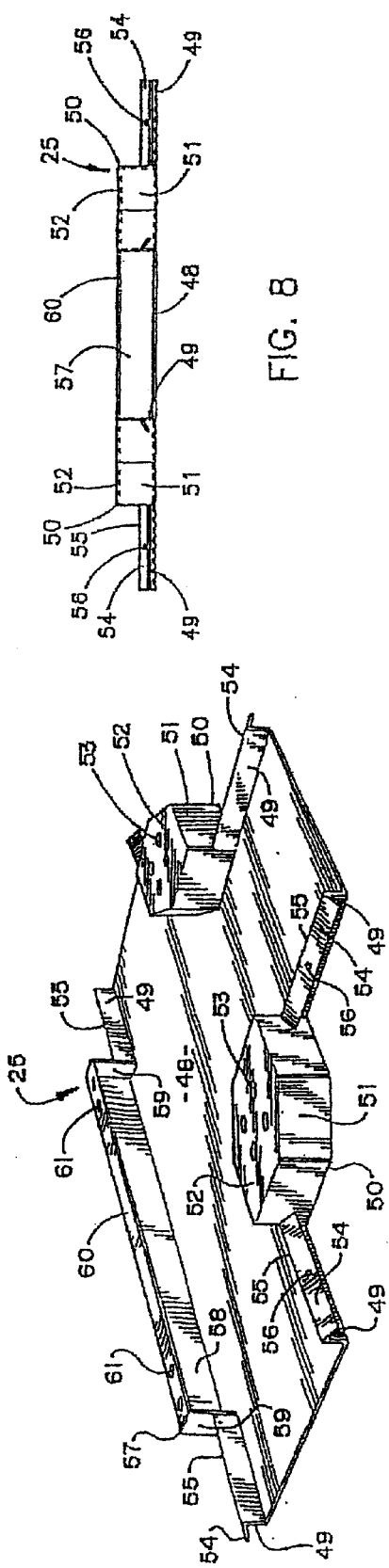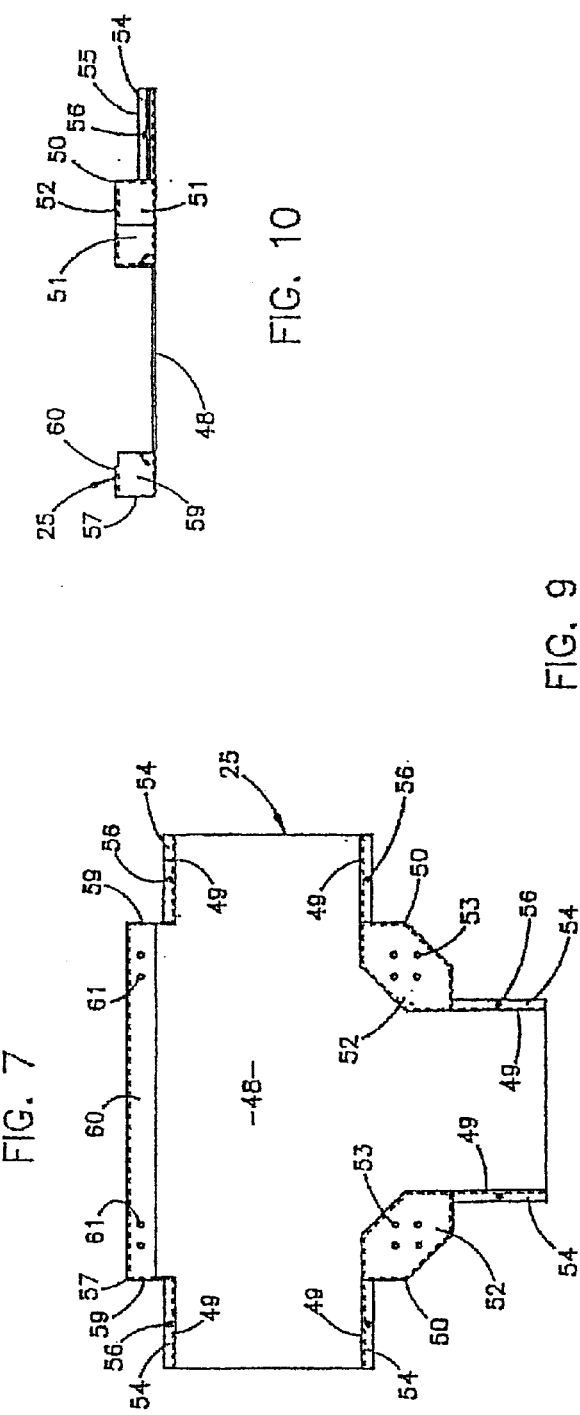

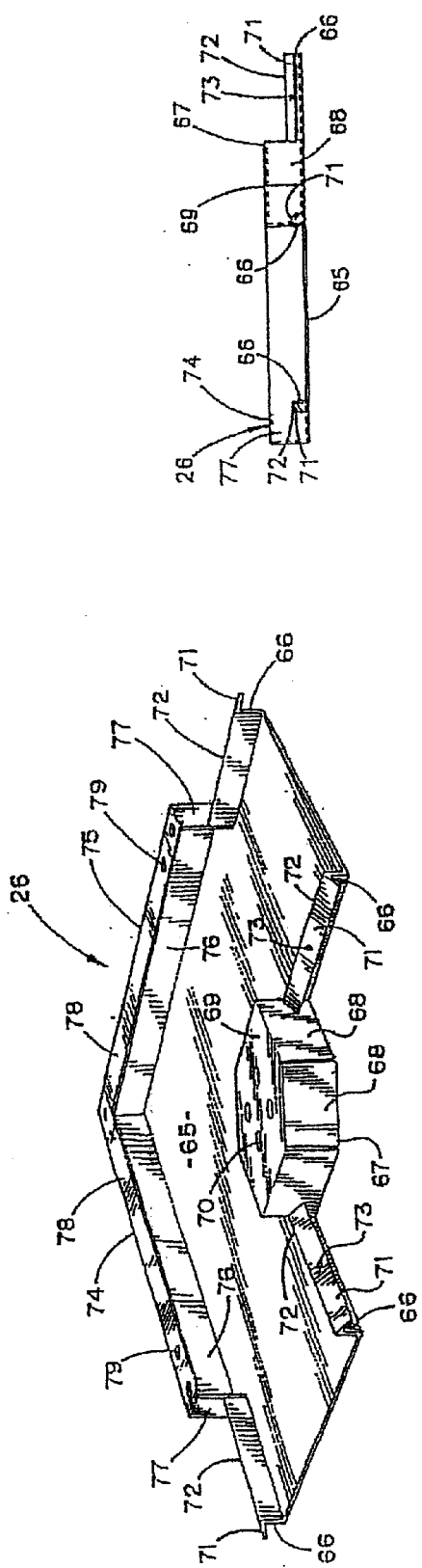
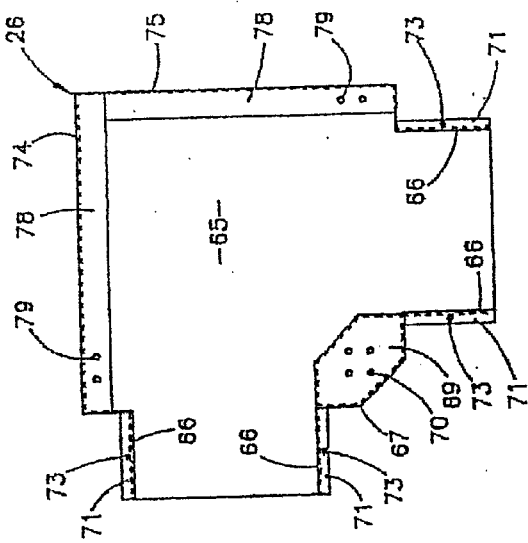
FIG. 11
FIG. 12
FIG. 13

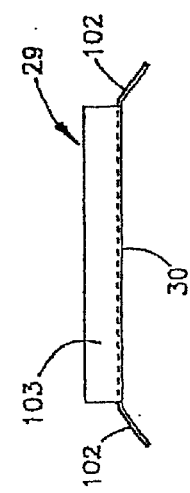
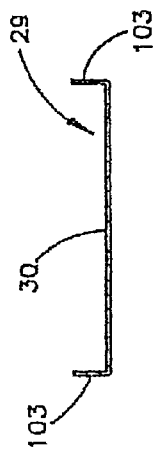
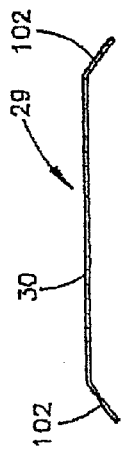
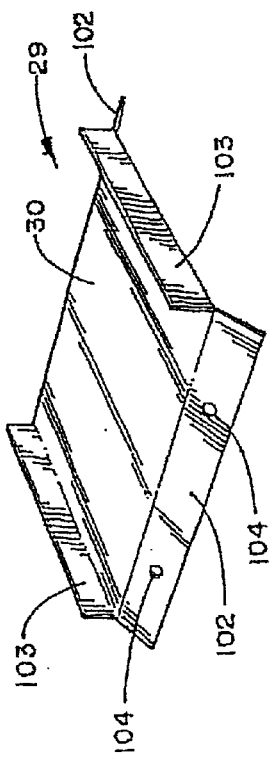
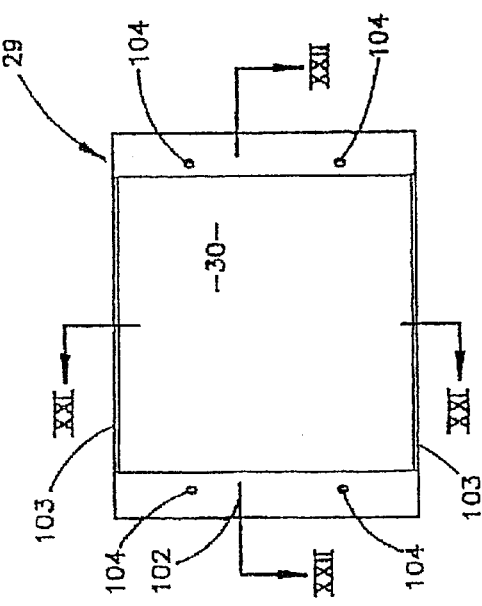
FIG. 19
FIG. 21
FIG. 22
FIG. 18
FIG. 20

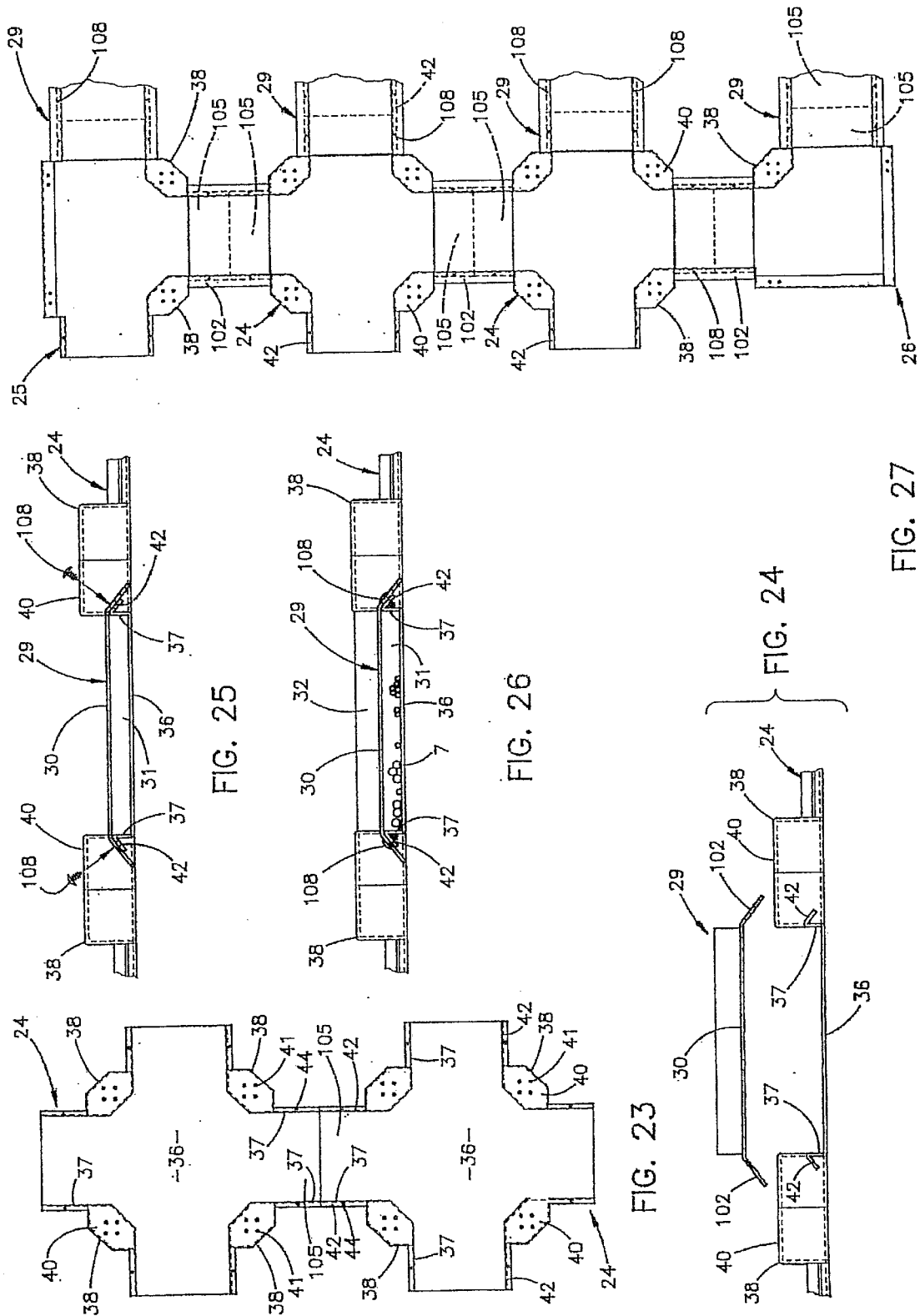

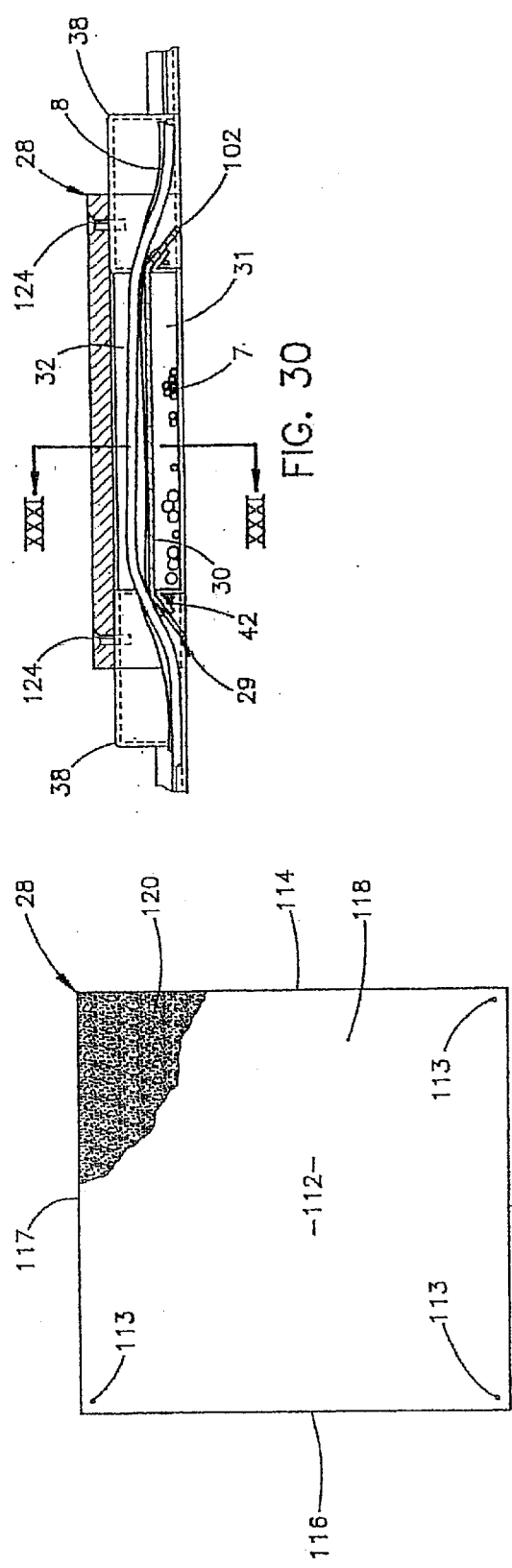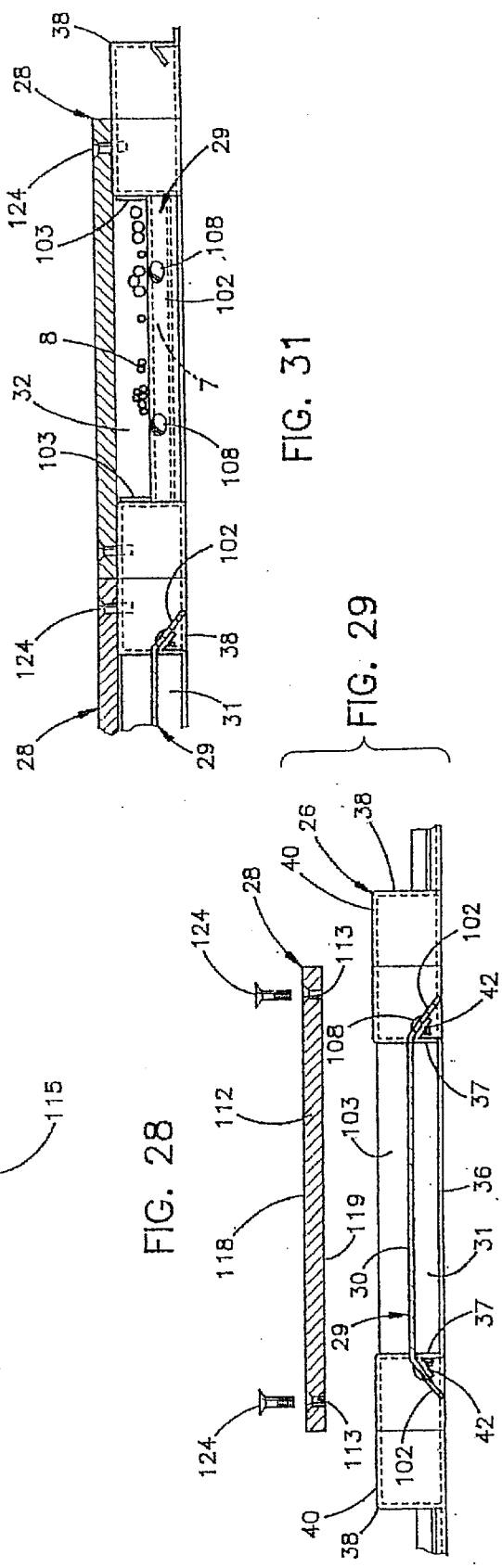

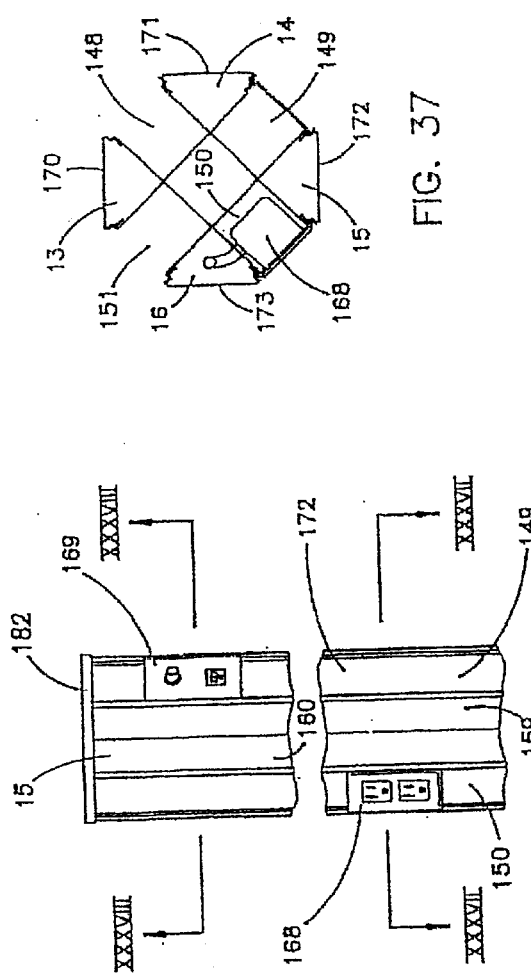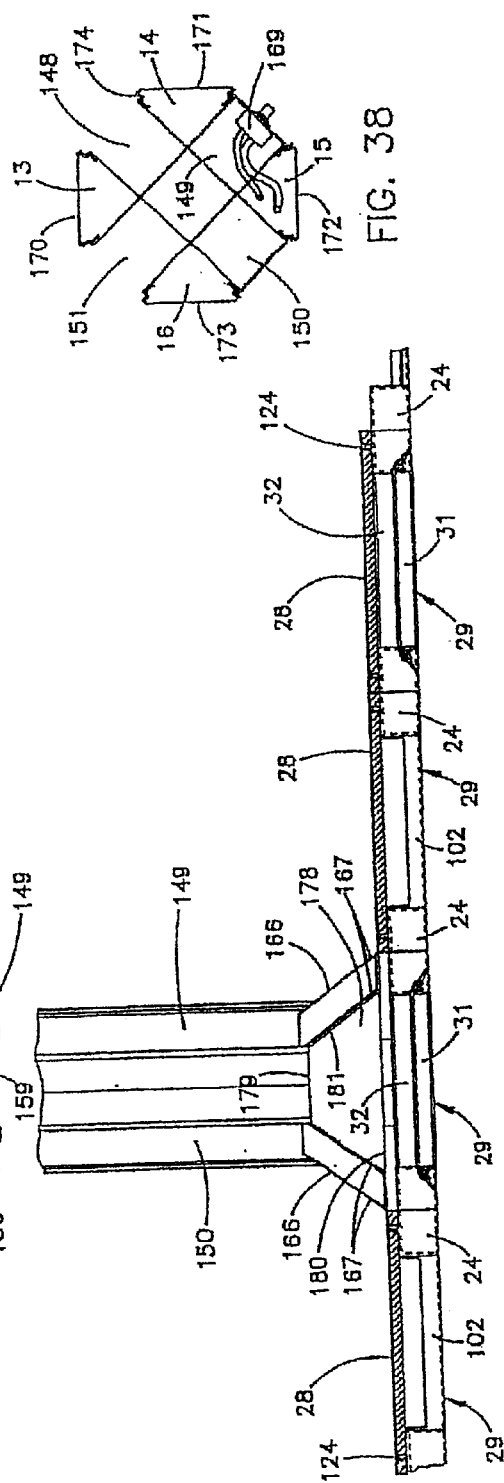

FLOOR MOUNTED UTILITY POST

CROSS-REFERENCES TO RELATED APPLICATIONS

The present application is a continuation of commonly assigned, co-pending U.S. patent application Ser. No. 09/342,722, filed Jun. 29, 1999, entitled FLOOR MOUNTED UTILITY POST, now U.S. Pat. No. 6,311,440, which is a continuation-in-part of commonly assigned U.S. Pat. No. 5,996,294, filed Mar. 6, 1998, entitled UTILITY DISTRIBUTION SYSTEMS FOR OPEN OFFICE PLANS AND THE LIKE, which is a continuation of commonly assigned U.S. Pat. No. 5,794,392, filed May 18, 1993, entitled UTILITY DISTRIBUTION SYSTEMS FOR OPEN OFFICE PLANS AND THE LIKE.

BACKGROUND OF THE INVENTION

The present invention relates to the distribution of utilities in open office plans and the like, and in particular to a prefabricated floor construction and utility post arrangement. Modern offices are becoming increasingly complicated and sophisticated due largely to the ever increasing needs of the users for improved utilities support at each workstation, such as communications, computers and other types of data processors, electronic displays, etc., including physical accommodations, such as lighting, HVAC, security, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving incredibly complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will find their place in the workplaces of the future.

One important consequence of the advent of sophisticated electronic offices is the increased need and desirability for distributing utilities throughout the various offices in a manner which can be readily reconfigured. The term "utilities" as used herein incorporates a wide variety of facilities for use at a workstation, including security devices, electrical power, signal and/or communications, HVAC, water and other fluids, and other similar resources. The ability to provide the worker with ready access to all of these utilities is clearly advantageous in the quest to promote worker well being and effectiveness.

The efficient use of building floor space is also an ever growing concern, particularly as building costs continue to escalate. Open office plans have been developed to reduce overall officing costs, and generally incorporate large, open floor spaces in buildings that are equipped with modular furniture systems which are readily reconfigurable to accommodate the ever changing needs of a specific user, as well as the divergent requirements of different tenants. One arrangement commonly used for furnishing open plans includes movable partition panels that are detachably interconnected to partition off the open spaces into individual workstation and/or offices. Such partition panels are configured to receive hang-on furniture units, such as worksurfaces, overhead cabinets, shelves, etc., and are generally known in the office furniture industry as "systems furniture". Another arrangement for dividing and/or partitioning open plans includes modular furniture arrangements, in which a plurality of differently shaped, freestanding furniture units are positioned in a side-by-side relationship, with upstanding privacy screens attached to at least some of the furniture units to create individual, distinct workstations and/or offices. Both of these types of modular furniture systems, as well as others, have been widely received due largely to their ability to be readily reconfigured and/or moved to a new site, since they are not part of a permanent leasehold improvement.

In order to gain increased efficiency in the use of expensive office real estate, attempts are now being made to try to support high paid knowledge workers with these types of modular furniture systems in open office settings, instead of conventional private offices. However, in order to insure peak efficiency of such knowledge workers, the workstations must be equipped with the various state-of-the-art utilities and facilities discussed above. Since such workstations must be readily reconfigurable to effectively meet the ever changing needs of the user, the distribution and control of utilities throughout a comprehensive open office plan has emerged as a major challenge to the office furniture industry.

At present, some types of modular furniture systems, such as selected portable partition panels and freestanding furniture units can be equipped with an optional powerway, which extends along the entire width of the unit, and has quick-disconnect connectors adjacent opposite ends thereof to connect with adjacent, like powerways, and thereby provide electrical power to an associated furniture group or cluster. Outlet receptacles are provided along each powerway into which electrical appliances can be plugged. Cable troughs or channels are also provided in most such furniture units, so as to form a system of interconnected raceways into which signal and communications wires can be routed. Such cabling is normally routed through the furniture system after the furniture units are installed, and is then hard wired at each of the desired outlets. While this type of distribution system has proven somewhat effective, the types of utilities provided are rather limited, and their distribution is not wholly modular, thereby resulting in higher installation and reconfiguration costs. The inherent nature of modular furniture systems, which permits them to be readily reconfigured into different arrangements, makes it very difficult to achieve adequate utility distribution.

SUMMARY OF THE INVENTION

One aspect of the present invention is to provide a utility distribution system for open office plans comprising a prefabricated floor construction and a utility post for distributing utilities. The prefabricated floor construction is adapted to be abuttingly supported on a building floor. The prefabricated floor construction includes a substantially hollow interior portion thereof defining at least one raceway to route at least one utility conduit therethrough and a plurality of floor tiles defining an upper surface of the floor construction. The utility post includes a floor tile shaped for installation in a prefabricated floor construction and at least one marginally positioned cutouts thereof disposed above the raceway and communicating therewith. The utility post further includes at least one vertical raceway being in communication with one of the at least one marginally positioned open foot area and a top located above the at least one vertical raceway.

Another aspect of the present invention is to provide a utility distribution system for open office plans a plurality of irregularly shaped floor pans, a plurality of rigid cover plates, a plurality of separator bridges, and at least one utility post. The plurality of irregularly shaped floor pans are adapted for abutting support directly on a floor surface in a mutually adjacent pattern. Each floor pan includes at least a portion of a first raceway in which first utilities can be routed and an exterior of the floor pan defines at least a portion of a second raceway in which second utilities can be routed. The plurality of rigid cover plates are supported on the floor pans in a mutually adjacent arrangement to define at least a portion of a continuous floor surface thereover. Each of the floor pans has at least one of the cover plates positioned thereover to enclosed the same. Each of the floor pan further has one of the separator bridges positioned thereon, with sidewalls of the one separator bridge being disposed above and oriented substantially perpendicular to sidewalls of the associated floor pan. Therefore, floor pans and separator bridges positioned adjacent one another on the floor surface portions of adjacent floor pans abut end-to-end so that the first raceway is shielded from the floor surface and extends continuously through the floor construction. The adjacent floor pans define an open floor space therebetween which defines at least a portion of the second raceway and the separator bridges physically separate the second raceway from the first raceway to positively prevent the second utilities from coming into contact with the first utilities and thereby minimize interference therebetween. The at least one utility post is supported on the floor pans. The utility post includes a base shaped for mounting on the floor pans, with the base having at least two cutouts therein positioned at separate edges of the base. The utility post further includes a pair of vertical raceways, each of the vertical raceway being in communication with one of the cutouts. The utility post also includes a top connected with upper portions of the raceway channels. The utility post is configured such that the first utility can be routed through a first one of the at least two cutouts and into a fist one of the vertical raceways. Likewise, the second utility can be routed through a second one of the at least two cutouts and into a second one of the vertical raceways.

These and other advantages of the invention will be further understood and appreciated by those skilled in the art by reference to the following written specification, claims, and appended drawings.

BRIEF DESCRIPTION OF THE DRAWINGS

FIG. 7 is a perspective view of a T-shaped floor pan portion of the floor construction.

FIG. 8 is front elevational view of the T-shaped floor pan.

FIG. 9 is a top plan view of the T-shaped floor pan.

FIG. 10 is a side elevational view of the T-shaped floor pan.

FIG. 11 is a perspective view of an L-shaped floor pan portion of the floor construction.

FIG. 12 is a side elevational view of the L-shaped floor pan.

FIG. 13 is a top plan view of the L-shaped floor pan.

FIG. 18 is a perspective view of a connector bridge portion of the floor construction.

FIG. 19 is a front elevational view of the connector bridge.

FIG. 20 is a top plan view of the connector bridge.

FIG. 21 is a cross-sectional view of the connector bridge, taken along the line XXI—XXI, FIG. 20.

FIG. 22 is a cross-sectional view of the connector bridge, taken along the line XXII—XXII, FIG. 20.

FIG. 23 is a top plan view of a pair of X-shaped floor pans positioned adjacent one another prior to interconnection.

FIG. 24 is a fragmentary cross-sectional view of the X-shaped floor pans shown in FIG. 3, with a connector bridge positioned thereover for interconnecting the same.

FIG. 25 is a fragmentary, cross-sectional view of the X-shaped connector pans shown in FIG. 23, wherein the connector bridge is positioned bridging the same prior to attachment.

FIG. 26 is a fragmentary, cross-sectional view of the X-shaped connector pans shown in FIG. 23, wherein the connector bridge is attached thereto, and wires are routed through associated raceways.

FIG. 27 is a fragmentary, top plan view of a plurality of different types of floor pans interconnected by associated bridges prior to routing cabling therethrough.

FIG. 28 is a top plan view of a cover plate portion of the floor construction.

FIG. 29 is a fragmentary, cross-sectional view of an X-shaped floor pan with an associated cover plate positioned thereover prior to attachment.

FIG. 30 is a fragmentary, cross-sectional view of the X-shaped floor pan and cover plate shown in FIG. 29, wherein the cover plate is fastened to the floor pan, and wires are routed through raceways formed therein.

FIG. 31 is a cross-sectional view of the floor construction shown in FIG. 30, taken along the line XXXI—XXXI, FIG. 30.

FIG. 36 is a partially schematic, fragmentary cross-sectional view of the floor construction with a utility post mounted thereon.

FIG. 37 is a cross-sectional view of the utility post shown in FIG. 36, taken along the line XXXVII—XXXVII, FIG. 36.

FIG. 38 is a cross-sectional view of the utility post shown in FIG. 36, taken along the line XXXVIII—XXXVIII, FIG. 36.

DETAILED DESCRIPTION OF THE PREFERRED EMBODIMENTS

Figure 1:
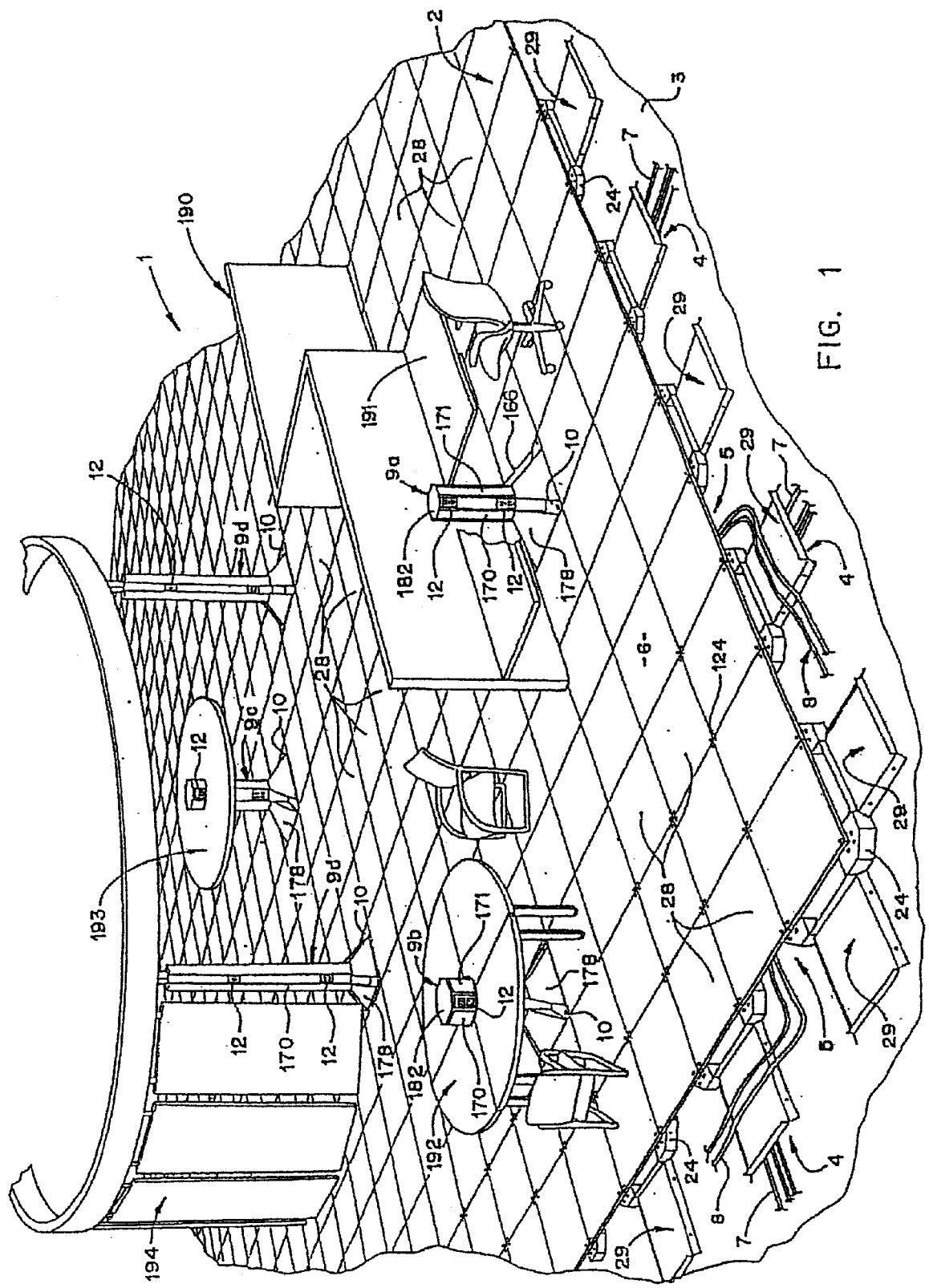
FIG. 1 is a fragmentary perspective view of a utility distribution system embodying the present invention, comprising a prefabricated floor construction, and associated utility posts.
Figure 2:
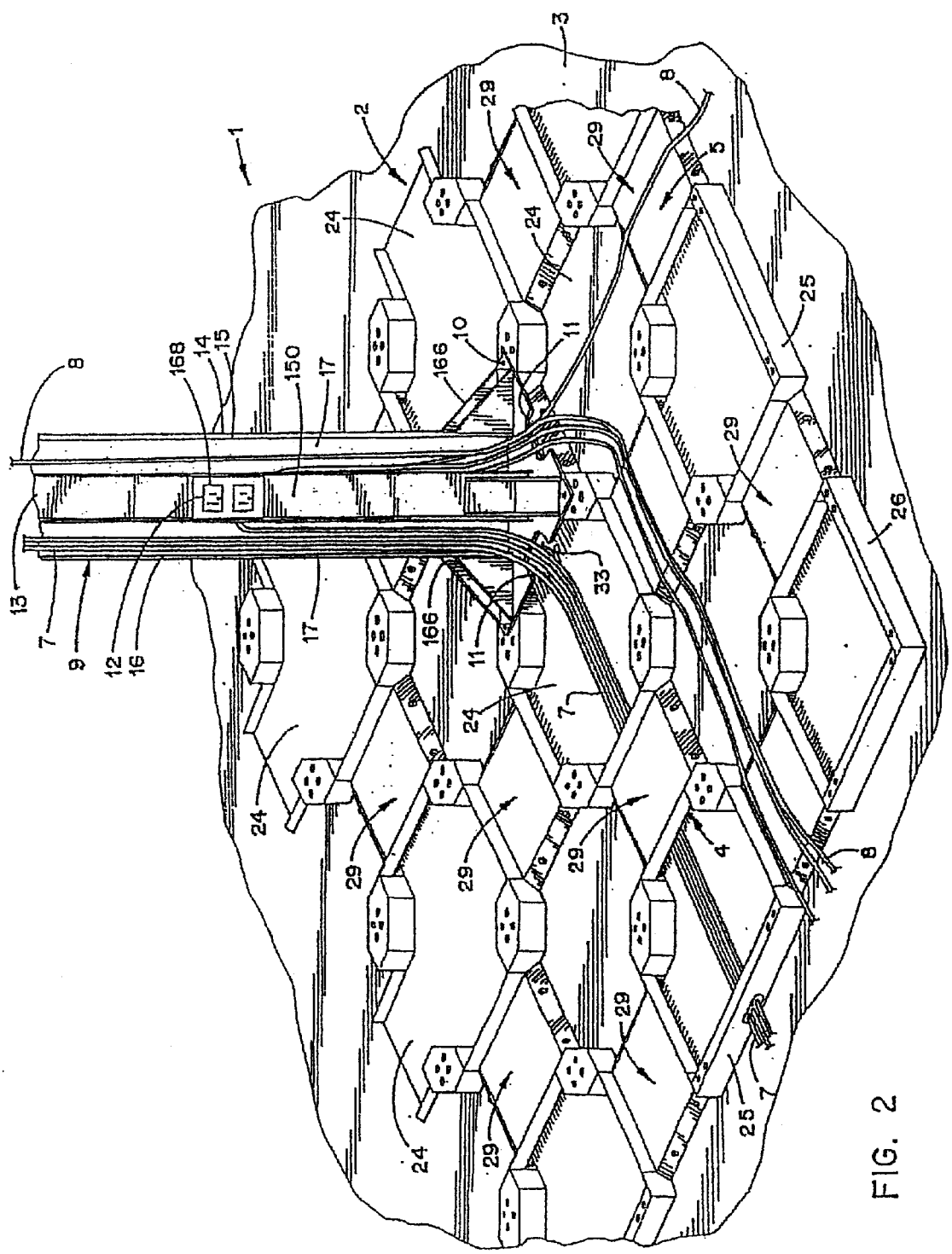
FIG. 2 is a fragmentary perspective view of the floor construction and one of the utility posts, wherein cover plate portions of the floor construction have been removed to reveal internal construction.

For purposes of description herein, the terms "upper", "lower", "right", "left", "rear", "front", "vertical", "horizontal", and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a utility distribution system embodying the present invention, which is particularly designed for use in open office plans, and other similar settings and environments. In the illustrated example, utility distribution system 1 includes a prefabricated floor construction 2 configured to be supported on a building floor 3. Floor construction 2 has a hollow interior arrangement that defines raceways 4 and 5 to route utility conduits 7 and 8 therethrough, and a floor surface 6 on which workstations may be positioned. It is to be understood that the term "utility conduit" as used herein contemplates various devices and arrangements for transmitting utilities between two points, such as air ducts, fluid pipes, electrical wires, fiber optic cables, and the like. The illustrated distribution system 1 also includes at least one utility post 9 having a foot portion 10 which mounts to floor construction 2 to support utility post 9 in a generally upstanding orientation. The foot portion 10 of utility post 9 has an open area 11 (FIG. 2) disposed above and communicating with at least one of the floor raceways 4 and 5. At least one utility outlet 12 is mounted on utility post 9, and is adapted to dispense a selected utility therefrom, such as electrical power, communication signals, HVAC, condition water, etc. Utility post 9 has utility channels 13–16, each having an outwardly oriented open face 17, and being shaped so that one or more of the utility conduits 7 or 8 can be routed therein. Each one of the utility channels 13–16 extends continuously between and communicates with an associated utility outlet 12 and an associated open area 11 of utility post foot 10, such that utilities can be readily provided to the workstations by simply pulling selected utility conduits 7 and 8 from floor raceways 4 and 5, through the open areas 11 in the foot portion 10 of an adjacent utility post 9, and then laying them into the utility channels 13–16 of utility post 9 by insertion into the open faces 17 thereof to a location adjacent the utility outlets 12 for connection therewith.

In the illustrated example, floor construction 2 (FIG. 3) is a prefabricated assembly that is designed to be supported directly on top a conventional building floor. Floor construction 2 includes a plurality of floor base members or pans 24–27, which are abuttingly supported on the floor surface 6 in a mutually adjacent, lattice-like arrangement. Each of the floor pans 24–27 has a generally U-shaped configuration, with a base that defines at least a portion of the raceway 4 extending generally continuously throughout floor construction 2. Rigid cover plates 28 are supported on floor pans 24–27 in a mutually adjacent arrangement to generally enclose raceway 4, and define the continuous floor surface 6 thereover. A plurality of connector bridges 29 extend between adjacent floor pans 24–27, and are attached thereto to physically interconnect the same. Connector bridges 29 each include a separator plate 30 (FIGS. 25 & 26) positioned a spaced apart distance above the bases of the adjacent floor pans 24–27 to form thereunder a lower connector raceway 31, which in combination with raceway 4, is adapted to receive a first type of utility therein, such as power conduits 7. The separator plate 30 of connector bridge 29 is positioned a spaced apart distance below the overlying cover plates 28 (FIGS. 30 & 31) to form thereover an upper connector raceway 32, oriented generally perpendicular to the lower connector raceway 31, which in combination with raceway 5 is adapted to receive and retain a second utility therein, such as communication or signal conduits 8. In this fashion, the power conduits 7 and signal conduits 8 can be routed through floor construction 2, while being physically separated from one another, so as to avoid both physical and/or functional interference between the same. It is to be understood that floor pans 24–27 may take a variety of different shapes and configurations, and in the examples illustrated herein, floor construction 2 includes an X-shaped floor pan 24, a T-shaped floor pan 25, an L-shaped floor pan 26, and a diagonal floor pan 27, all of which are mutually interconnected by connector bridges 29, and enclosed by cover plates 28, as discussed in greater detail hereinafter.

Figure 5:
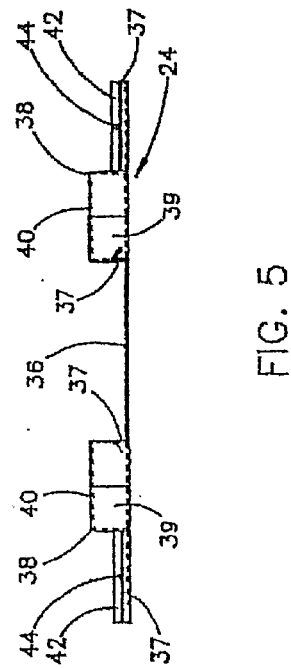
FIG. 5 is a side elevational view of the X-shaped floor pan.
Figure 4:
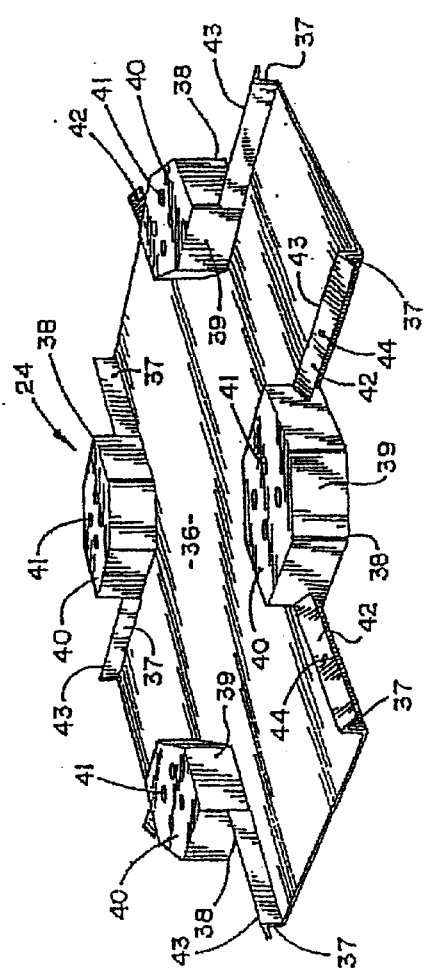
FIG. 4 is a perspective view of an X-shaped floor pan portion of the floor construction.
Figure 6:
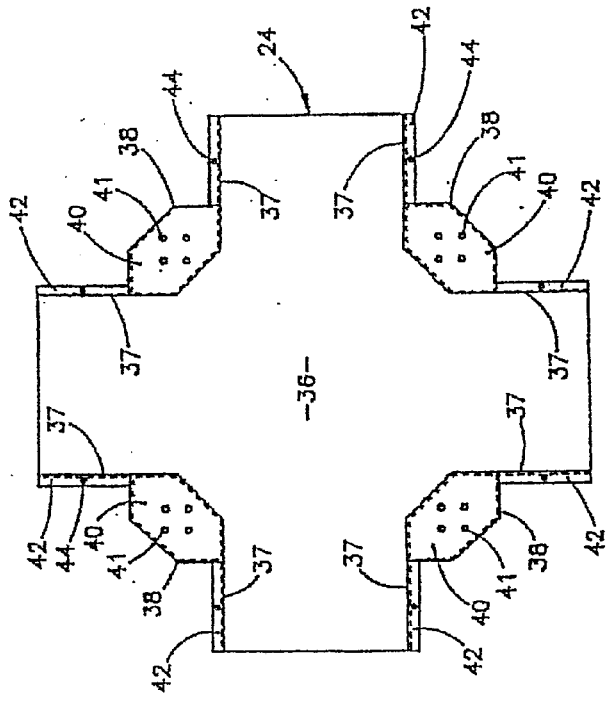
FIG. 6 is a top plan view of the X-shaped floor pan.
Figure 15:
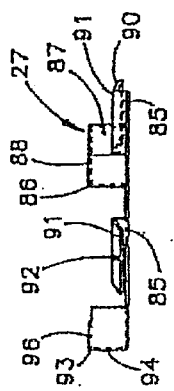
FIG. 15 is a side elevational view of the diagonal floor pan.
Figure 17:
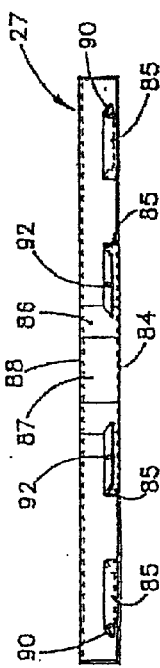
FIG. 17 is a front elevational view of the diagonal floor pan.
Figure 14:
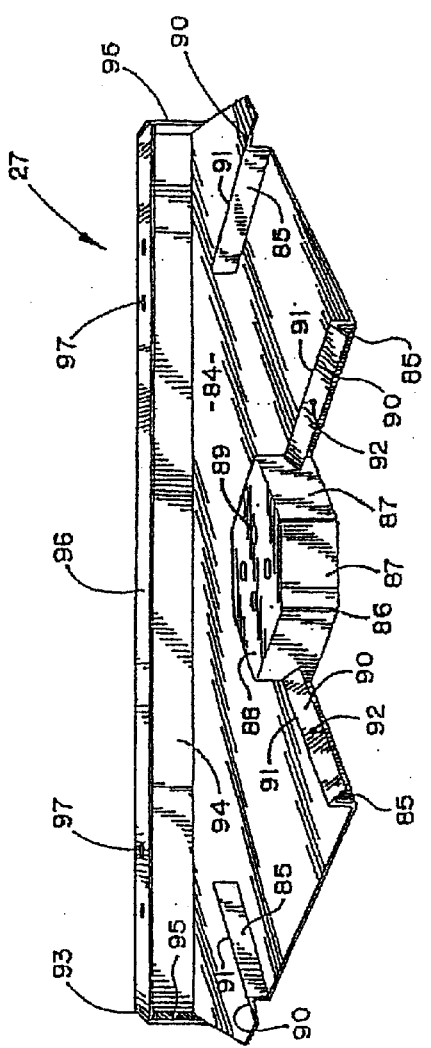
FIG. 14 is a perspective view of a diagonal floor pan portion of the floor construction.
Figure 16:
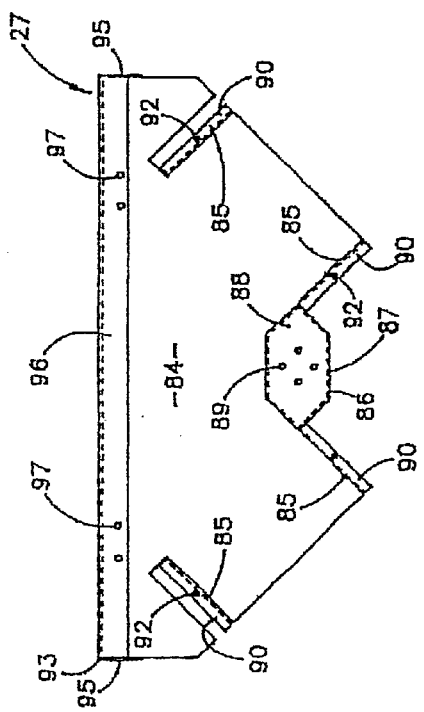
FIG. 16 is a top plan view of the diagonal floor pan.

With reference to FIGS. 4–6, the illustrated X-shaped floor pan 24 is rigid, and has a generally U-shaped vertical cross-sectional configuration, comprising an X-shaped base 36, and four pairs of upstanding sidewalls 37. X-shaped floor pan 24 has four raised pedestals 38 positioned adjacent each exterior corner of pan base 36, which are configured to support cover plates 28 thereon. Each pedestal 38 has a generally hexagonal top plan configuration, with six sidewalls 39, and an upper pad 40 with four fastener apertures 41 therethrough arranged in a square pattern. Each pair of upstanding pan sidewalls 37 associated with X-shaped floor pan 24 has an angle flange 42 along its upper edge 43, which angle flange 42 extends downwardly therefrom at an angle of approximately 45 degrees. Each angled flange 42 has a perpendicularly oriented fastener aperture 44 therethrough for attaching an associated connector bridge 29. The upper edge 43 of each pair of pan sidewalls 37 is positioned at a preselected distance below the upper pad 40 of the associated raised pedestal 38 to accommodate the mounting of a connector bridge 29 on angle flanges 42, and thereby separating or dividing the interior space of X-shaped floor pan 24 between lower connector raceway 31, and upper connector raceway 32, as described in greater detail below. In the illustrated example, the upper edges 43 of each pair of floor pan sidewalls 37 are positioned at around the vertical midpoint of the associated raised pedestal 38.

With reference to FIGS. 7–10, the illustrated T-shaped floor pan 25 is rigid, and has a generally U-shaped vertical cross-sectional configuration, comprising a T-shaped base 48, and three pairs of upstanding sidewalls 49. T-shaped floor pan 25 has two raised pedestals 50 positioned adjacent the interior facing corners of pan base 48, which are configured to support cover plates 28 thereon. Each pedestal 50 has a generally hexagonal top plan configuration, with six sidewalls 51, and an upper pad 52 with four fastener apertures 53 therethrough arranged in a square pattern. Each pair of upstanding pan sidewalls 49 associated with T-shaped floor pan 25 has an angle flange 54 along its upper edge 55, wherein angle flange 54 extends downwardly therefrom at an angle of approximately 45 degrees. Each angle flange 54 has a perpendicularly oriented fastener aperture 56 therethrough for attaching an associated connector bridge 29. The upper edge 55 of each pair of pan sidewalls 49 is positioned a preselected distance below the upper pad 52 of the associated raised pedestal 50 to accommodate the mounting of connector bridge 29 on angle flanges 54, and thereby separating or dividing the interior space in T-shaped floor pan 25 between lower connector raceway 31, and upper connector raceway 32, as described in greater detail below. In the illustrated example, the upper edges 55 of each pair of floor pan sidewalls 49 are positioned at around the vertical midpoint of the associated raised pedestal 50. A raised support channel 57 extends along the exterior edge of pan base 48, and includes a sidewall 58, end walls 59, and an upper flange 60 positioned generally level with the upper pads 52 of pedestals 50. The upper flange 60 of support channel 57 is shaped to support cover plates 28 thereon, and includes four perpendicularly oriented fastener apertures 61 therethrough to facilitate connection with cover plates 28.

With reference to FIGS. 11–13, the illustrated L-shaped floor pan 26 is rigid, and has a general U-shaped vertical cross-sectional configuration, comprising an L-shaped base 65, and two pairs of upstanding sidewalls 66. L-shaped floor pan 26 has one raised pedestal 67 positioned adjacent the interior facing corner of pan base 65, and is configured to support cover plates 28 thereon. Pedestal 67 has a generally hexagonal top plan configuration, with six sidewalls 68, and an upper pad 69 with four perpendicularly oriented fastener apertures 70 therethrough arranged in a square pattern. Each pair of upstanding pan sidewalls 66 associated with L-shaped floor pan 26 has an angle flange 71 extending along its upper edge 72, wherein angle flange 71 extends downwardly therefrom at an angle of approximately 45 degrees. Each angle flange 71 has a perpendicularly oriented fastener aperture 73 therethrough for attaching an associated connector bridge 29. The upper edge 72 of each pan sidewall 66 is positioned a preselected distance below the upper pad 69 of raised pedestal 69 to accommodate the mounting of a connector bridge 29 on angle flanges 71, and thereby separating or dividing the interior space of L-shaped floor pan 26 between lower connector raceway 31, and upper connector raceway 32, as described in greater detail below. In the illustrated example, the upper edges 72 of floor pan sidewalls 66 are positioned at around the vertical midpoint of raised pedestal 67. A pair of raised support channels 74 and 75 extend along the exterior facing side edges of pan base 65, and each includes a sidewall 76, endwalls 77, and an upper flange 78 positioned generally level with the upper pad 69 of pedestal 67. The upper flange 78 of each support channel 74 and 75 is shaped to support cover plates 28 thereon, and includes perpendicularly oriented fastener apertures 79 to facilitate detachable connection with cover plates 28.

With reference to FIGS. 14–17, the illustrated diagonal floor panel 27 is rigid, and has a generally U-shaped vertical cross-sectional configuration, comprising a W-shaped base 84, and two pairs of upstanding sidewalls 85. Diagonal floor pan 27 has one raised pedestal 86 positioned adjacent the interior facing corner of pan base 84, and is configured to support cover plates 28 thereon. Pedestal 86 has a generally hexagonal top plan configuration, with six sidewalls 87, and upper pad 88 with four perpendicularly oriented fastener apertures 89 therethrough arranged in a square pattern. Each pair of upstanding pan sidewalls 85 associated with diagonal floor pan 27 has an angle flange 90 along its upper edge 91, wherein angle flange 90 extends downwardly therefrom at an angle of approximately 45 degrees. Each angle flange 90 has a perpendicularly oriented fastener aperture 92 therethrough for attaching an associated connector bridge 29. The upper edge 91 of both pairs of pan sidewalls 85 is positioned a preselected distance below the upper pad 88 of pedestal 86 to accommodate the mounting of a connector bridge 29 on angle flanges 90, and thereby separating or dividing the interior space of diagonal floor pan 27 between lower connector raceway 31, and upper connector raceway 32, as described in greater detail below. In the illustrated example, the upper edges 91 of both pairs of floor pan sidewalls 85 are positioned at around the vertical midpoint of raised pedestal 86. A raised support channel 93 extends along the exterior facing side edge of pan base 84, and includes a sidewall 94, endwalls 95, and an upper flange 96 positioned generally level with the upper pad 88 of pedestal 86. The upper flange 96 of support channel 93 is shaped to support cover plates 28 thereon, and includes perpendicularly oriented fastener apertures 97 to facilitate the detachably connection of cover plates 28.

Floor pans 24–27 may be constructed from formed sheet metal, molded plastic, and other similar arrangements, and are preferably capable of effectively isolating various electrical wires, such as power conduits 7 and signal conduits 8 from one another. Although floor pans 24–27 are rigid to securely support cover plates 28 thereon, due to their modular construction, they will generally conform to an existing building floor surface 6, even when the same is not precisely level.

With reference to FIGS. 18–22, the illustrated connector bridge 29 is rigid, and has a generally U-shaped vertical cross-sectional configuration, comprising a flat or planar separator plate 30, having a pair of side flanges 102 depending from one pair of opposite side edges of plate 30, and a pair of upper flanges 103 upstanding from the opposite pair of side edges of plate 30. Side flanges 102 are oriented at an angle of approximately 45 degrees with respect to separator plate 30, extend generally continuously therealong, and each includes a pair of perpendicularly oriented fastener apertures 104 therethrough to facilitate connection with floor pans 24–27. Upper flanges 103 are oriented substantially perpendicular with respect to separator plate 30, and extend generally continuously along the side edges thereof. Like floor pans 24–27, connector bridge 29 may be constructed from formed sheet metal, molded plastic, or other similar arrangements, and is preferably capable of effectively isolating various electrical wires, such as power conduits 7 and signal conduits 8 from one another.

With reference to FIGS. 23–27, floor construction 2 is assembled in the following manner. Floor pans 24–27 are selected and arranged on the building floor surface 6 in the desired configuration, such as the arrangements shown in FIGS. 2 and 3. T-shaped floor pans are generally arranged about the periphery or marginal portion of the floor construction 2, while L-shaped floor pans 26 are typically positioned at each right angle corner thereof. Diagonal floor pans 27 may be positioned about the marginal portion of a floor construction 2 which has one side disposed at a 45 degree angle with respect to the remaining sides. X-shaped floor pans 25 are typically positioned interior of the marginal portion of floor construction 2. Floor construction 2 can be arranged so that it covers the entire expanse of building floor 3, or can be configured to cover only selected areas thereof, so as to provide one or more utility pads that are located strategically throughout the open plan.

In all such embodiments, floor pans 24–27 (FIGS. 23–27) are arranged on building floor 3, such that the end edges of their associated bases are positioned adjacent one another in the manner illustrated in FIG. 23. Connector bridges 29 are then positioned over the joint formed between adjacent floor pans 24–27 in the manner illustrated in FIGS. 24–25. At each joint, the side flanges 102 of connector bridge 29 are positioned in abutment with the angle flanges of associated pan sidewalls, such as the angle flanges 42 of the X-shaped pan sidewalls 37 shown in FIGS. 24–26. Fasteners 108 are then inserted through the apertures 104 of connector bridge 29 and into the underlying apertures 44 in angle flanges 42, so as to securely interconnect adjacent floor pans 24–27 in their selected orientation, as illustrated in FIG. 27.

As best illustrated in FIGS. 25 & 26, the attachment of a connector bridge 29 to two adjacent floor pans 24–27 not only physically interconnects the same, but also assists in defining connector portions of the two utility raceways 4 and 5, which extend throughout floor construction 2. For example, when the two X-shaped floor pans 24 shown in FIG. 23 are interconnected by a connector bridge 29, as shown in FIG. 26, the interconnected leg portions 105 of pan bases 36 are enclosed by separator plate 30, such that pan base 36, pan sidewalls 37 and bridge separator plate 30 combine to create a fully enclosed raceway which is identified herein as lower connector raceway 31. Lower connector raceway 31 communicates directly with utility raceway 4, which is formed by the interior areas of the remaining floor pans 24–27. Connector bridge 29 also forms a portion of upper connector raceway 32, which is disposed directly above lower connector raceway 31, and is oriented perpendicular therewith. The upper connector raceway 32 is also fully enclosed after floor construction 2 is installed, and is defined by bridge separator plate 30, opposite bridge flanges 103, and cover plate 28. Upper connector raceway 32 communicates directly with utility raceway 5, which is formed by that space disposed beneath cover plates 28, and exterior to floor pans 24–27. In the illustrated example, utility raceway 4 is particularly designed to route electrical power conduits 7 through floor construction 2, while utility raceway 5 is particularly designed to route data and/or communication cables through floor construction 2.

After the selected floor pans 24–27 are interconnected by connector bridges 29 in the manner shown in FIGS. 23–27, and before assembly of cover plates 28, an initial utility installation may be made in floor construction 2. In the illustrated example, electrical power conduits 7 and signal cables 8 are installed in utility raceways 4 and 5 respectively in a fashion designed to provide utilities to each planned workstation, or in a predetermined plan which routes the utilities to each possible workstation location. In the floor construction shown in FIGS. 1–3, signal cables 8 can be simply laid in position in raceway 5 by routing them over that portion of the building floor disposed between adjacent floor pans 24–27, and over the separator plates 30 of selected connector bridges 29, through upper connector raceways 32, in a somewhat zigzag pattern. Electrical power conduits 7 are routed through raceway 4 by laying the same into the interior of floor pans 24–27, and threading the wires under the separator plates 30 of selected connector bridges, through lower connector raceways 31, in a checkerboard pattern. It is to be noted that in some installations, it may be possible to lay power conduits 7 in floor pans 24–27 before connector bridges 29 are attached, so as to avoid threading the wires through lower connector raceways 31.

With references to FIGS. 28–31, each of the illustrated cover plates 28 comprises a rigid base plate 112 having a substantially square top plan configuration, with four perpendicularly oriented fastener apertures 113 extending therethrough adjacent each corner of base plate 112. Each base plate 112 includes opposite side edges 114–117, and planar, mutually parallel upper and lower surfaces 118 & 119 respectively. In the example illustrated in FIG. 28, a segment of carpet 120, or other similar floor covering is adhered to the upper surface 118 of base plate 112. Base plate 112 may be constructed of sheet metal, plastic, or other similar materials which are capable of supporting substantial weight thereon without sagging.

Figure 3:
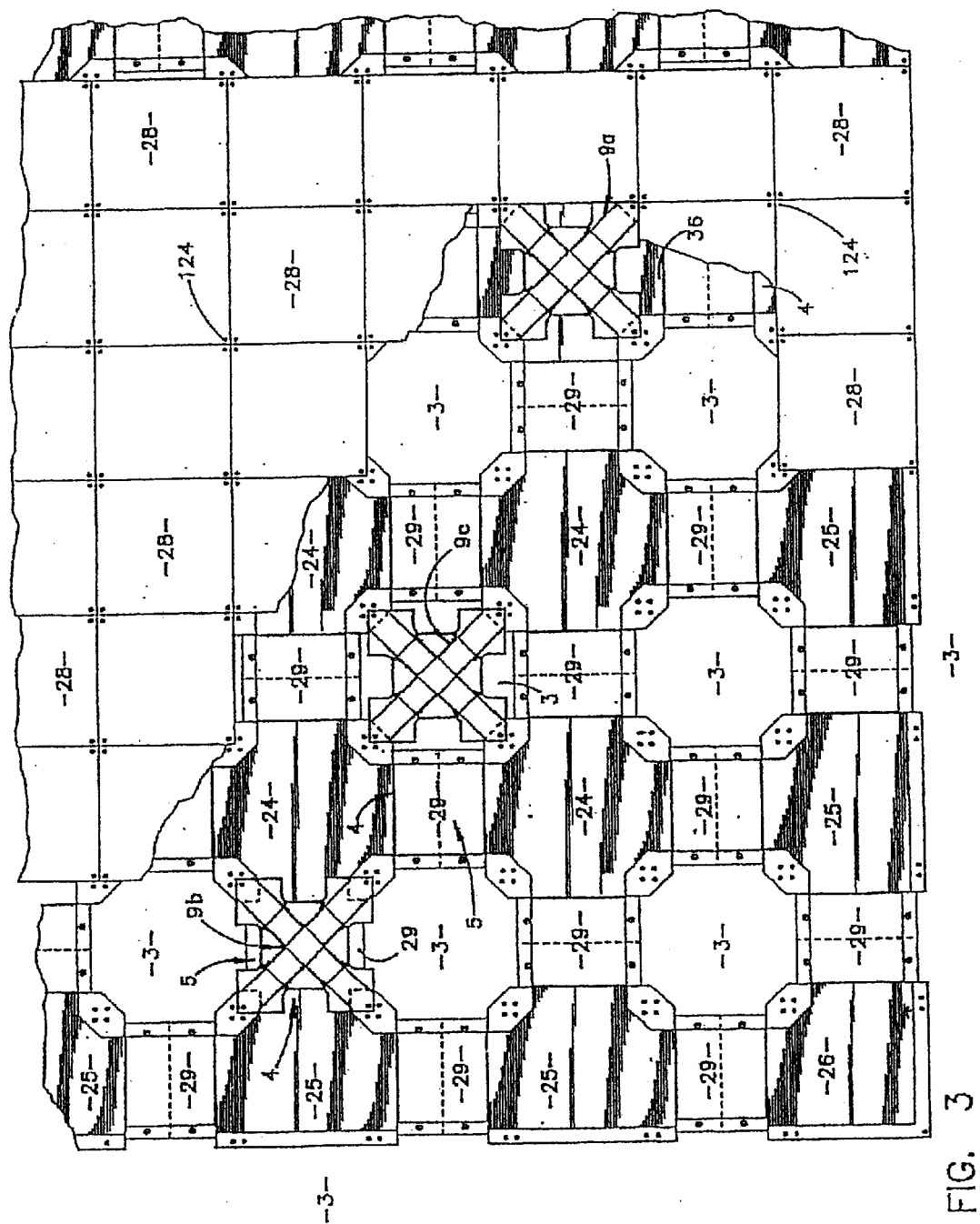
FIG. 3 is a fragmentary top plan view of the utility distribution system.

Cover plates 28 are assembled over the selected floor pans 24–27 to fully enclose floor construction 2, as shown in FIGS. 1 and 3. Cover plates 28 are juxtaposed side-by-side on floor pans 24–27 to form a continuous or uninterrupted floor surface 6 on which workstations and/or other furniture may be positioned. In the X-shaped floor pans 26 shown in FIGS. 29–31, a cover plate 28 is positioned on the four upper pads 40 of pan pedestals 38. Fasteners 124 are inserted through each of the four fastener apertures 113 in base plate 112 and mounted securely in the underlying pad apertures 41. Cover plates 28 are similarly mounted to floor pans 25–27, wherein cover plates 28 are also connected to the associated support channels, such as the support channel 57 of T-shape floor pan 25, the two support channels 74 and 75 of L-shaped floor pan 26, and the support channel 93 of diagonal floor pan 27.

Cover plates 28 not only serve to form the upper support surface 6 for floor construction 2, but also enclose the underlying floor space, which includes those areas above floor pans 24–27, as well as the remaining open areas of building floor 3. As a result, raceways 4 and 5 are both fully enclosed, and are mutually separated, with connector bridges 29 serving to permit cross-over between raceways 4 and 5, while maintaining physical isolation or separation. In the event local regulations specify that existing building floors can not qualify as an electrical barrier, a sheet of insulating material can be applied over building floor 3 prior to assembly of floor construction 2 thereon to improve its utility distribution capabilities, particularly with respect to utility raceway 5.

The disclosed utility distribution system 1 (FIG. 1) also includes utility posts 9 which interact with floor construction 2 to distribute utilities to the various workstations. With reference to FIGS. 32–38, each of the illustrated utility posts 9 has a channel-like, elongated post portion 126, and a foot portion 10 shaped similar to cover plate 28, such that a cover plate 28 can be removed from floor pans 24–27, and the foot portion 10 of a utility post 9 mounted in its place. Utility posts 9 preferably have a rigid construction for upright mounting on floor construction 2, and may be provided in a plurality of different lengths or heights to accommodate a variety of needs and uses. With reference to FIG. 35, utility post foot 10 has a generally square overall plan configuration, similar to that of cover plate 28, and is defined by side edges 130–133, and upper and lower surfaces 134 and 135 respectively. Each of the side edges 130–133 of utility post foot 10 has an open, notched out area 31–36 located at a generally medial or central portion thereof. Each of the open foot notches 31–36 is defined by a base edge 137, and opposing side edges 138 oriented in a generally U-shaped plan configuration. Utility post foot 10 includes perpendicularly oriented fastener apertures 139 extending through each corner thereof, identical to the arrangement of fastener apertures 113 on cover plate 28.

Figure 34:
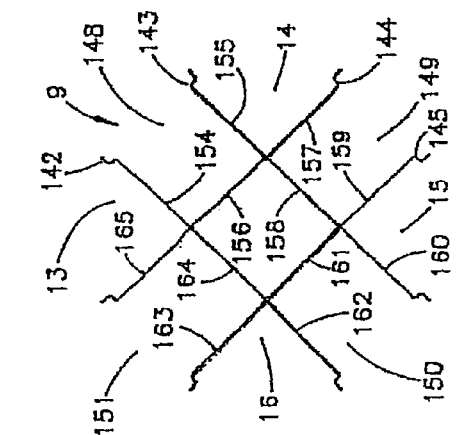
FIG. 34 is a horizontal cross-sectional view of the utility post, taken along the line XXXIV—XXXIV, FIG. 32.
Figure 35:
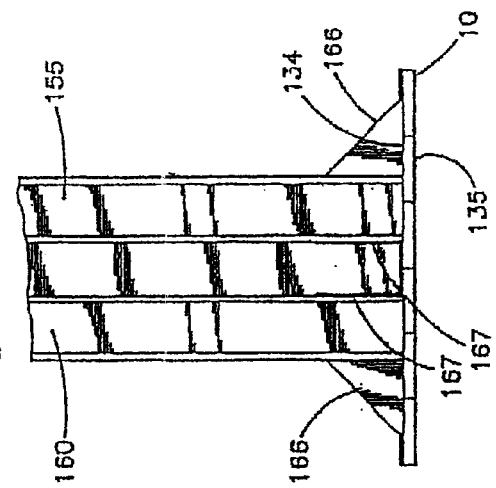
FIG. 35 is a cross-sectional view of the utility post, taken along the line XXXV—XXXV, FIG. 34.
Figure 33:
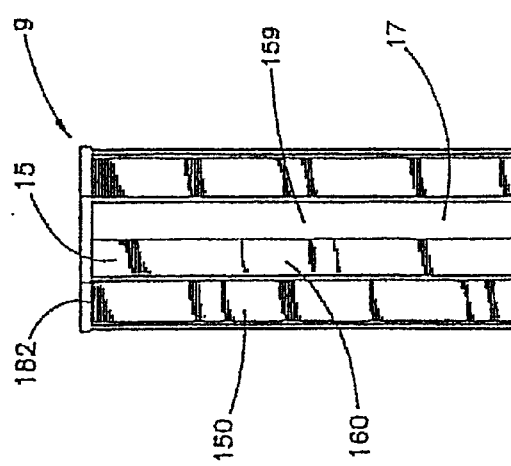
FIG. 33 is a side elevational view of the utility post.
Figure 32:
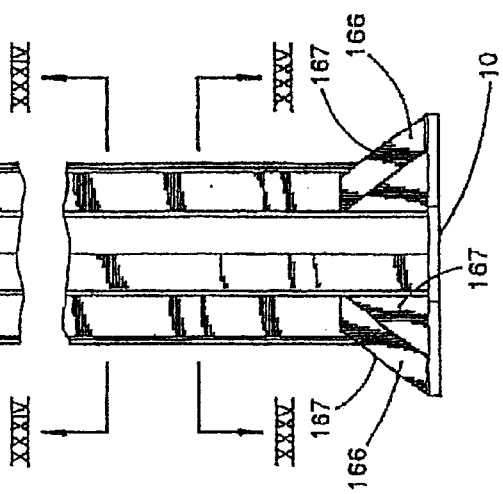
FIG. 32 is a front elevational view of the utility post.

As best illustrated in FIG. 34, the post portion 126 of utility post 9 has a generally X-shaped transverse cross-sectional configuration, comprising two parallel pairs of flat, perpendicularly intersecting walls 142–145. Intersecting walls 142–146 define a plurality of outwardly oriented, open-faced channels, which include four generally U-shaped mounting channels 148–151, and four generally V-shaped utility channels 13–16. The four mounting channels 148–151 are oppositely oriented in an outwardly radiating fashion, as are utility channels 13–16, which are positioned inbetween adjacent mounting channels 148–151. Mounting channel 148 is defined by wall segments 154–156, mounting channel 149 is defined by wall segments 157–159, mounting channel 150 is defined by wall segments 160–162, and mounting channel 151 is defined by wall segments 163–165. Utility channel 13 is defined by wall segments 154 and 165, utility channel 14 is defined by wall segments 155 and 157, utility channel 15 is defined by wall segments 159 and 160, and utility channel 16 is defined by wall segments 162 and 163. Four triangularly shaped gusset channels 166 interconnect the lower portion of post portion 126 with foot portion 10, and each includes a pair of sidewalls 167 oriented in radiating alignment with the corner fastener apertures 139 in foot portion 10. As best viewed in FIG. 35, the lower ends of utility channels 13–16 are aligned and communicate with an associated one of the open areas 31–34 of utility post foot 10, while the open ends of mounting channels 148–151 are aligned with the sidewalls 167 of an associated one of the gusset channels 116 on post foot 10.

Each of the utility channels 13–16 (FIGS. 36–38) has a generally triangular transverse cross-sectional configuration, and is adapted to receive and retain therein one or more utility conduits such as wires, cables, tubes, etc. Mounting channels 148–151 have a generally square transverse cross-sectional configuration, and are adapted to receive and retain therein one or more utility outlets 12, such as the illustrated duplex power outlet 168, the illustrated communication junction block 169, and other similar devices. Since mounting channels 148–151 are each generally open along their entire length, each utility channel can receive a plurality of utility outlets therein arranged in a vertically stacked configuration.

With reference to FIGS. 36–38, each of the utility channels 13–16 associated with utility post 9 includes a removable cover 170–173 which selectively encloses the same. In the illustrated example, each of the utility channel covers 170–173 includes a pair of inwardly angled side flanges 174 which matingly engage the outer free edges of the associated channel walls 142–145 to detachably mount the same on utility post 9 with a snap lock type of action. The illustrated utility post 9 also includes four, trapezoid shaped foot covers 178, which are positioned over the lower ends of utility channels 13–16. Each foot cover 178 (FIG. 36) includes an upper edge 179 extending adjacent the bottom on an associated one of the channel covers 170–173, a lower edge 180 extending along the upper surface 134 of post foot 10, and a pair of side edges 181 extending along the free edges of gusset sidewalls 167 to thereby enclose the lower part of each lower post portion 126 which is aligned with an associated utility channel 13–16. Foot covers 178 are detachably mounted to utility post 9 to permit ready access to the underlying raceways 4 and 5 in floor construction 2. Utility post 9 also includes a top cap 182 connected with the upper end of post portion 126, and enclosing the upper ends of each of the utility channels 13–16 and the mounting channels 148–151.

Figure 39:
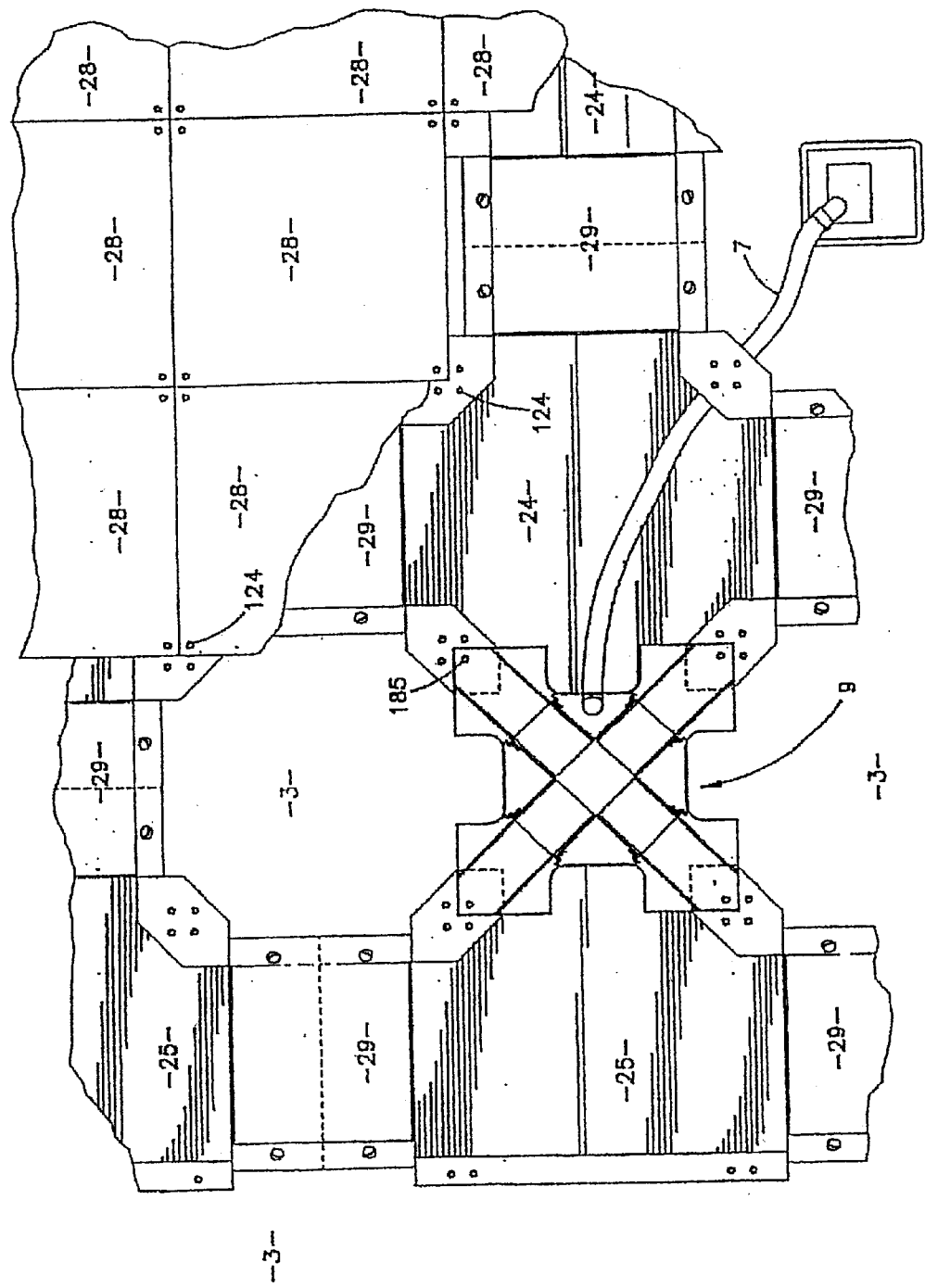
FIG. 39 is a fragmentary, top plan view of the floor construction with a utility post mounted thereon, with utility conduits being routed therethrough.

In operation, utility posts 9 may be assembled on floor construction 2 at any desired location in the following fashion. Assuming that cover plates 28 have been preassembled over each of the selected floor pans 25–27, the cover plate 28 disposed at that location at which each utility post 9 is desired must first be removed by simply removing associated fasteners 124, and detaching the selected cover plate 28 from its underlying floor pan or pans. A utility post 9 is then selected, and the foot portion 10 thereof is placed in the space vacated by the removed cover plate 28, such that foot base plate 112 is supported abuttingly on the underlying pan, such as in the arrangement shown in FIG. 39. Fasteners 185 are then inserted through the fastener aperture 139 in each corner of utility post foot 10, so as to securely mount utility post 9 on floor construction 2. Utility outlets 12 are mounted in the mounting channels 148–151 of utility post 9.

Mounting channels 148–151 are preferably preassigned or designated for use with certain types of utility outlets 12, so as to physically separate those utilities which might experience some degree of physical and/or functional interference. For example, the illustrated mounting channels 148 and 150 are assigned for power outlet devices, such as power outlet 168, and the opposite mounting channels 151 and 159 are assigned for communication junctions and other signal devices, such as signal block 169. Similarly, utility channels 13–16 are preferably preassigned or designated for use with certain types of utilities, such as power lines and signal cables. The illustrated utility channels 14 and 16 are assigned for power lines 7, and utility channels 13 and 15 assigned for signal cables or conductors 8. In any event, each of the various utility outlets 12 desired is mounted in an associated one of the mounting channels 148–152, preferably in accordance with the predesignated configuration noted above.

As best illustrated in FIG. 2, when utility post 9 is mounted on floor construction 2, the utility channels 13–16 are oriented to be in alignment with the underlying utility raceways 4 and 5. More specifically, one oppositely oriented pair of the utility channels 13–16 will open into utility raceway 4, and the other pair of oppositely oriented utility channels 13–16 will open into utility raceway 5. In the system shown in FIG. 2, utility raceway 4 has been designated for electrical power conduits 7, and utility raceway 5 has been designated for signal conduits 8, which include communication lines, data wires, etc. Hence, utility post 9 has been oriented on the X-shaped floor pan 24 to which it is attached with utility channel 16 and U-shaped foot opening 33 communicating with a forwardly facing side of power raceway 4, and utility channel 14 and U-shaped foot opening 31 communicating with a rearwardly facing side of power raceway 4. Furthermore, in this orientation, utility channel 15 and U-shaped foot opening 32 communicate with the forwardly facing side of signal raceway 5, and utility channel 13 and U-shaped foot opening 34 communicate with a rearwardly facing side of signal raceway 5. Power conduits 7 and signal conduits 8 may be fed into floor construction 2 in a variety of different ways, including the floor feed arrangement shown in FIG. 39 for power conduit 7, or the side feed arrangement shown in FIG. 2 for power conduits 7 and signal conduits 8.

With reference to FIG. 3, it will be noted that utility post 9 can be mounted at a plurality of locations on floor construction 2, including mounting on the four pedestals 38 of a single X-shaped floor pan 24, directly above the center portion of its associated base 36, as illustrated utility post 9a, or alternatively between the adjacent legs 105 of a T-shaped floor pan 25 and a X-shaped floor pan 24, directly above the connector bridge 29, as in illustrated utility post 9b, or alternatively on the four pedestals of four adjacent X-shaped floor pans 24, directly above the open building floor 3, as in illustrated utility post 9c. In each of these orientations, the utility channels 13–16 of the utility post 9 can be communicated with the utility raceways 4 and 5 in floor construction 2 to permit routing utilities, such as power conduits 7 and signal conduits 8 therethrough.

Utility conduits 7 and 8 are then routed from their associated raceways 4 and 5 within floor construction 2 to each of the selected utility outlets 12 in the following fashion. Selected cover plates 28 are first removed from around utility post foot 10, so as to expose the underlying raceways 4 and 5, and determine what utility conduits 7 and 8 are readily available.

Utility conduits 7 and 8 are then selected and routed into the selected ones of the utility channels 13–16 by first routing the same through that one of the open foot areas 31–34 associated with the selected one of the utility channels 13–16. The utility conduits 7 and 8 are simply laid into the selected utility channels 13–16 by insertion into the open faces 17 thereof to a location adjacent the associated utility outlet 12 to which it is to be connected. An aperture is formed in the wall of post portion 126 disposed between the utility channel and the selected utility outlet, so that the selected utility conduit can be inserted into the utility outlet and thereby connected. After each such utility outlet 12 is similarly connected with its associated utility conduit 7 or 8, channel covers 170–173 are mounted over each utility channel 13–16, and foot covers 178 are mounted at the base of post portion 126.

With reference to FIG. 1, in one embodiment of the present invention, utility posts 9 are positioned freestanding on floor construction 2 adjacent those locations at which the selected utilities are desired. For instance, freestanding utility post 9a is positioned for use with a panel based systems furniture system 190, and may extend up through and/or adjacent associated worksurfaces 191. Utility post 9 might also be positioned between the sides of adjacent partition panels (not shown) to function as a spine with outlets 12 accessible on both sides of the panel system. Alternatively, the illustrated freestanding utility post 9b is used as a bollard for a mobile table system 192.

In yet another embodiment of the present invention, utility post 9 may be physically incorporated into a furniture system. For example, the illustrated utility post 9c is used to support a tabletop 193. Alternatively, the illustrated utility posts 9d are used as support columns in an overhead partitioning system 194, which is the subject of commonly assigned, co-pending U.S. patent application Ser. No. 774,563, now U.S. Pat.No. 5,511,348. Utility posts 9 might be used as the vertical uprights in the workspace module arrangement which is the subject of commonly assigned, co-pending U.S. patent application Ser. No. 819,396, now U.S. Pat. No. 5,282,341. It is to be understood that utility post 9 may also be used to support a wide variety of other types of furniture applications, such as supports for partition panels, furniture unit supports, etc.

Utility distribution system 1 is quite versatile, and provides not only a unique prefabricated floor construction 2 which is adapted to physically separate different types of utility conduits to avoid interference, but also a novel utility post 9 which permits the distribution of utilities from the floor construction 2 at various locations throughout the system. Utility distribution system 1 is very efficient, and quite adaptable to effectively support a wide variety of different furniture systems and configurations.

Figure 40:
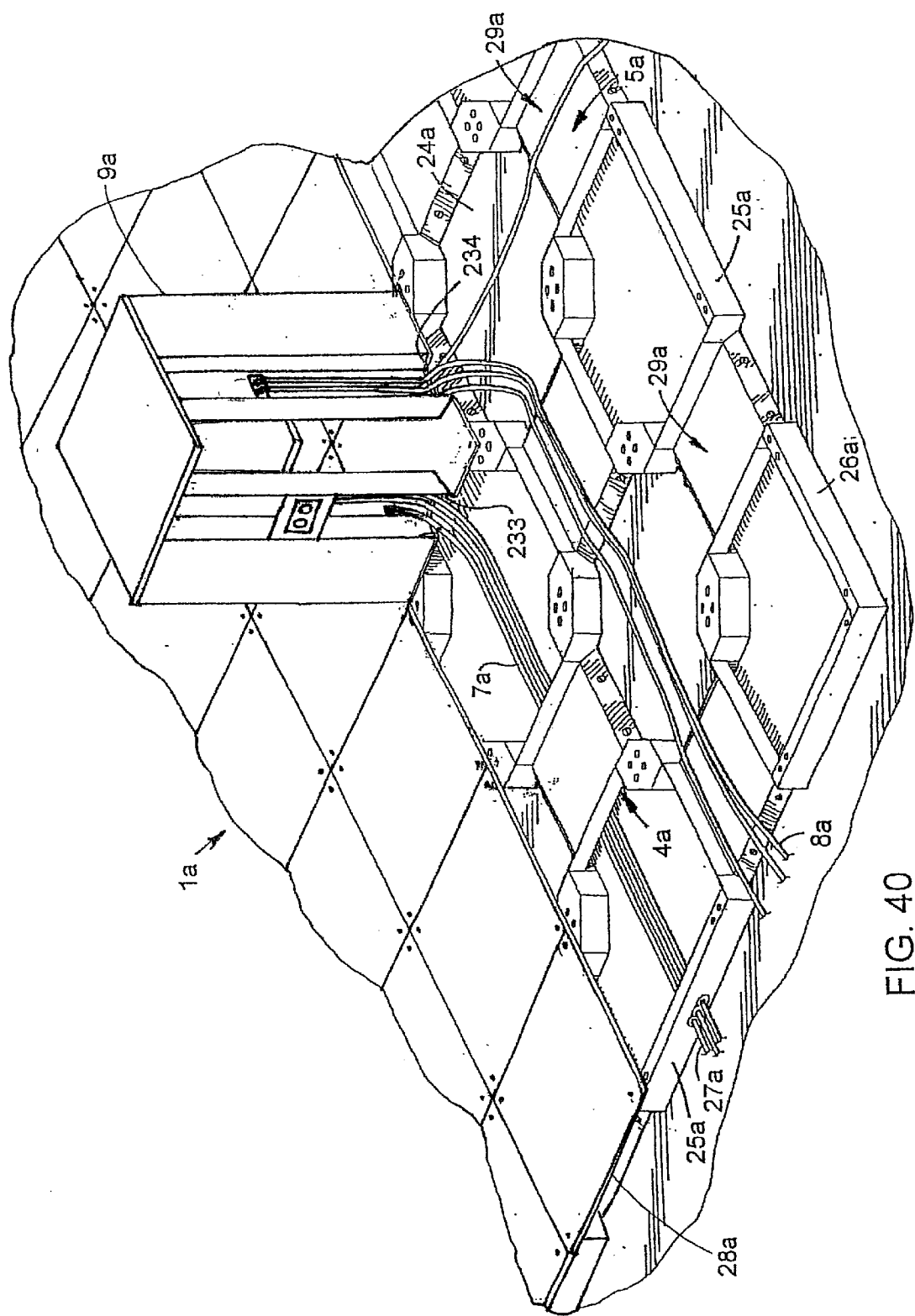
FIG. 40 is fragmentary perspective view of a second embodiment of the floor mounted utility post mounted on the floor construction, wherein floor tile portions of the floor construction have been removed to reveal internal construction and utility conduit routing.

The reference numeral 1a (FIG. 40) generally designates a raised floor construction incorporating a plurality of supports such as central supports 24a, end supports 25a, and corner supports 26a, which are interconnected one to the other by bridges 29a to form a lattice-like support structure, which, in combination, also defines a hollow interior arrangement of first raceways 4a and second raceways 5a, to route first utility conduits 7a and second utility conduits 8a therethrough. A floor surface comprising a plurality of floor tiles 28a is supported by the underlying support structure. A floor mounted utility post 9a, including vertical channels 233 and 234 facilitates the routing of utility conduits 7a and 8a, respectively, from the underlying floor raceways 4a and 5a for presentation of the utilities to an office worker for access and use thereof.

Figure 41:
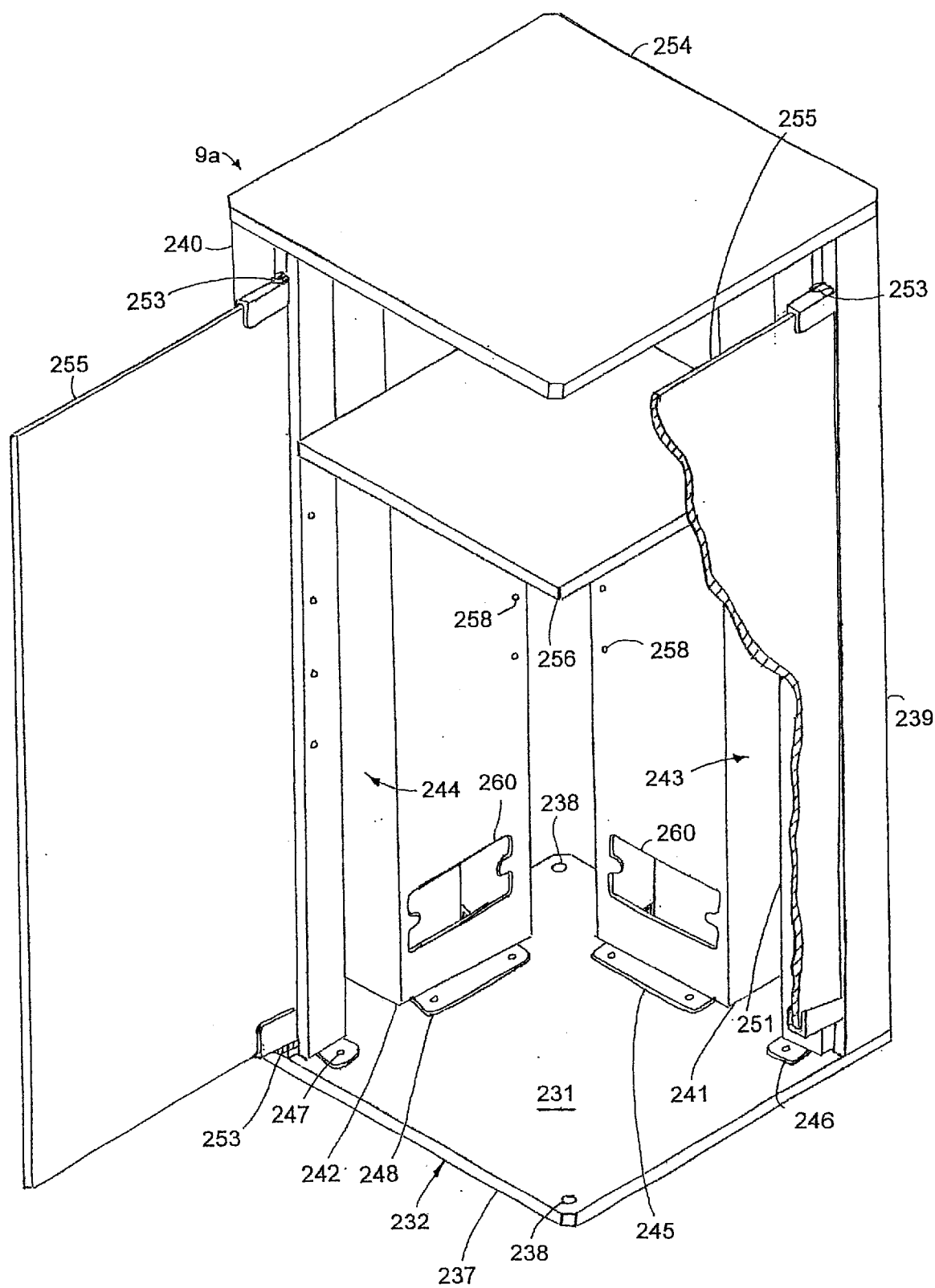
FIG. 41 is a perspective view of the second embodiment of the floor mounted utility post incorporating one door and one shelf mounted therein.
Figure 42:
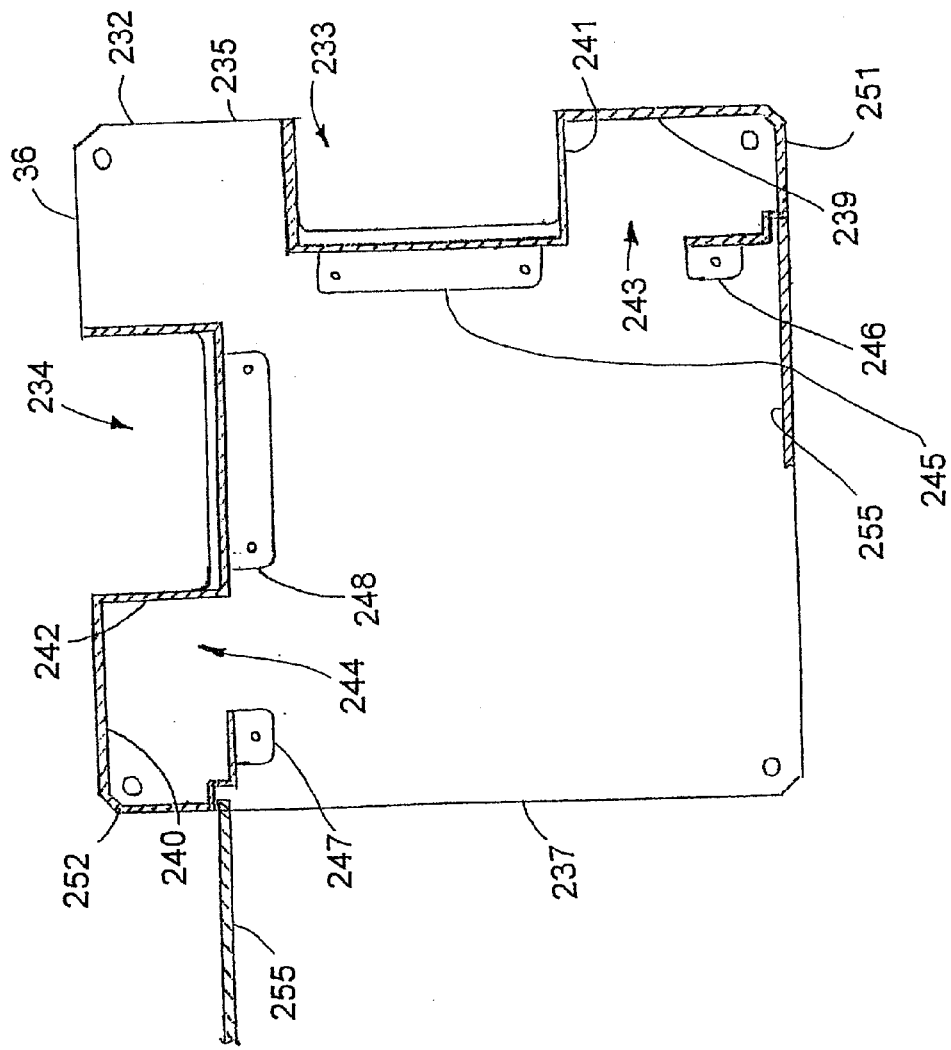
FIG. 42 is a cross-sectional view of the second embodiment of the floor mounted utility post taken along the line XLII—XLII of FIG. 41.

As best illustrated in FIGS. 41 and 42, a preferred embodiment of floor mounted utility post 9a, is comprised of a bottom 232, which can be uniquely constructed to replace a particular floor tile 28a, or alternatively, can be a floor tile 28a which is modified to facilitate the mounting of the remainder of the utility post structure thereon. Bottom 232 includes cutouts or channels 233 and 234 at first and second adjacent peripheral edges, respectively. Bottom 232 also includes holes 238 configured to correspond with the mounting hole pattern of floor tiles 28a for securing floor mounted utility post 9a to the underlying floor support structure. Bottom 232 can be formed from any base or floor tile from any raised floor construction by configuring the base to replace an existing floor tile or by modifying the existing floor tile with notches and then attaching vertical raceways to the base as discussed below.

A pair of mirror image vertical raceways 239 and 240 include U-shaped raceway channels 241 and 242, and are positioned on bottom 232 in such a manner that raceway channels 241 and 242 are aligned with and communicate with cutouts 233 and 234 respectively. Cutouts 233 and 234 and raceway channels 241 and 242 face the exterior of utility post 9a and provide an unobstructed channel to facilitate the routing of utility conduits 7a and 8a in a lay-in manner without necessitating the feeding of utility conduits through an aperture for placement within channels 241 and 242. Tabs 245–248 at the bottoms of raceways 239 and 240 abut an upper surface 231 of bottom 232, for attaching vertical raceways 239 and 240 to bottom 232. Attachment of tabs 245–248 to bottom 232 can be made in any number of ways which are known in the art, such as using screws, welding, glues, and the like, depending on the materials used to fabricate bottom 232 and vertical raceways 239 and 240.

In the preferred embodiment each of vertical raceways 239 and 240 includes a flange 251 and 252, respectively, extending about a portion of the periphery of bottom 232 at opposite corners of bottom 232. While various geometrical configurations of the combined raceway and flange are possible and contemplated herein, the preferred embodiment combines the vertical channel 241 and flange 251 to define in top plan an S-shaped raceways 239. Likewise, vertical channel 242 and flange 252 are combined to define raceway 240 in a reverse S-shape. For purposes herein, both configurations are referred to as S-shaped. The second loop of the S-shape opens to the interior of post 9a thereby defining first and second inner channels 243 and 244 that function as an internal raceway in post 9a for the vertical routing of utility conduits in the interior of post 9a.

At least one of flanges 251 and 252 such as flange 252 and has hinges 253 mounted at an upper and lower position thereon, to support a door 255. Door 255 is moveable between an open position, as shown in FIG. 41, permitting access to an interior of utility post 9a, and a closed position, which is parallel to third peripheral edge 237 of bottom 232. Doors 255 are somewhat smaller in height than the opening to which they are hinged, and in the preferred embodiment are made from either translucent or smoked glass. Doors 255 define in combination with top 254 and bottom 230 of post 9a top and bottom gaps 265 and 266 that can be used to route utility conduits from an interior of post 9a to a work area remote from the post. When used as a sole utility post, utility post 9a can also include a second door 255 mounted in like manner to flange 251 of vertical raceway 239 to further enclose the interior of utility post 9a. A top 254 is attached to upper ends of vertical raceways 239 and 240 to provide additional enclosure of the interior of utility post 9a and to provide a surface upon which office utilities may be placed or office activities can be performed. It will also be understood that top 254 can comprise a variety of configurations such as enclosures for multiple utility outlets, platforms for projectors, podium or lectern tops for presentation, and the like.

A shelf 256 can be supported in the interior portion of utility post 9a, utilizing screws or pegs to support the shelf at flanges 251 and 252, and raceway channels 241 and 242, respectively in a manner well known in the art. The interior volume of post 9a facilitates utility conduit storage for the routing of temporary utility extensions to a remote work location on an as needed basis. A plurality of holes 258 can be provided at various vertical heights along the vertical length of raceway channels 241 and 242 and flanges 251 and 252, to facilitate the vertical repositioning of shelf 256. Raceway channels 241 and 242 can also include apertures 260 therethrough, for the routing of utility conduits 7a and 8a (FIG. 40) to the interior of utility post 9a, for connection to utility articles housed within utility post 9a and supported by bottom 232 or shelf 256. Additionally, apertures 260 can be configured to mount standard utility receptacles therein.

Figure 43:
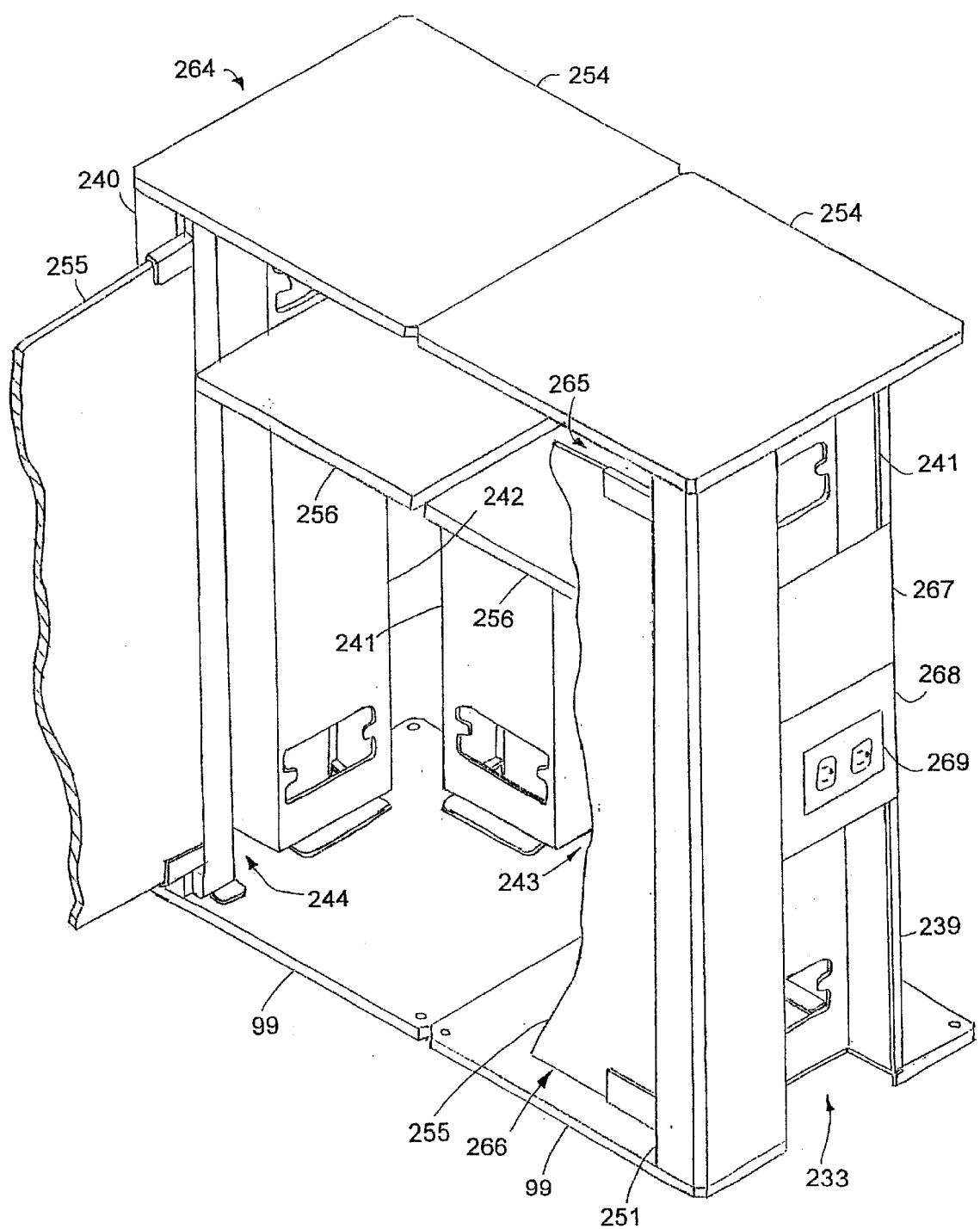
FIG. 43 is a perspective view of two adjacent floor mounted utility posts of the second embodiment of the floor mounted utility post with the doors removed for clarity, wherein the adjacent posts form an equipment cabinet.
Figure 44:
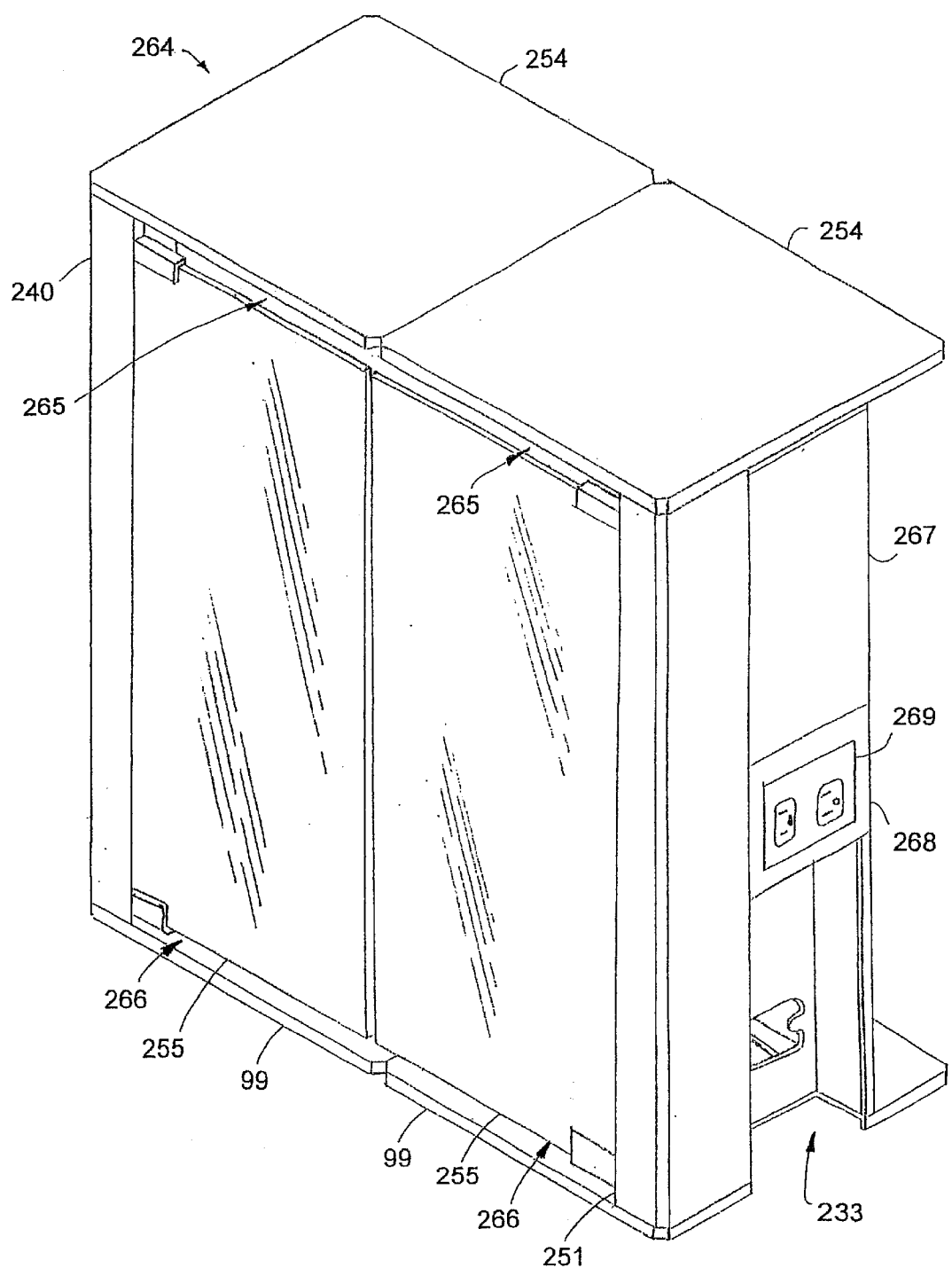
FIG. 44 is a perspective view of two adjacent floor mounted utility posts of the second embodiment of the floor mounted utility posts of FIG. 43 with the doors closed.

Referring now to FIG. 43, an alternate configuration and use of utility post 9a is shown as a dual utility post, shown generally at 264. Dual utility post 264 is comprised of two identical utility posts 9a which replace two adjacent floor tiles 28, and can be configured as a cabinet to house larger pieces of utility equipment therein. Dual utility post 264 is formed by removing opposite doors 255 from each of adjacent utility posts 9a, and abutting the sides of utility post 9a not including a door 255 one to the other. Such an abutting arrangement of single utility posts 9a will form a cabinet-like unit, wherein each of a left and right sides are defined by a vertical raceway 240 of a first of utility posts 9a, and by a vertical raceway 239 of the second of the utility posts 9a. The back of the dual utility post 264 is formed by the others of the vertical raceways 239 and 240. The front of the dual utility post 264 is formed by the remaining doors 255 which are separately hinged at the right and left ends of dual utility post 264. The top of the cabinet can comprise two individual tops 254 as utilized on individual utility posts 9a, or alternatively comprise one top (not shown) sufficiently large to cover both utility posts 9a. The doors 255 have been deleted from FIG. 43, for purposes of clarity.

As shown in FIG. 43, outwardly facing raceway channels 241 and 242 can be enclosed with one or a plurality of vertically stacked covers 267 and 268. The covers can be configured as solid covers 267 for the sole purpose of enclosing raceway channel 241 or 242, or alternately, can be configured as cover 268, incorporating a utility outlet 269 therein for presentation of utilities to the exterior of utility post 9a or 264 access to office workers in the vicinity of utility posts 9a or 264. Additionally, the covers can be provided in different sizes to facilitate the desired height and cover configuration. In the preferred embodiment the covers are manufactured in three sizes having a height ratio of 1:2:3, although other ratios can be also used to obtain the identical functionality. The segmented covers permit the mounting of utility outlets at varying heights as defined by the requirements of the user. Utility outlet 269 is shown as an electrical power outlet, however it will be understood that outlet 269 can be of any configuration which is appropriate to deliver the desired type of utility and interface connector to the potential user.

In the foregoing description, it will be readily appreciated by those skilled in the art that modifications may be made to the invention without departing from the concepts disclosed id herein. Such modifications are to be considered as included in the following claims, unless these claims by their language expressly state otherwise.

We claim:

1. A utility distribution system for open office plans comprising:

a prefabricated floor construction adapted to be abuttingly supported on a building floor, and including a substantially hollow interior portion thereof defining at least one raceway to route at least one utility conduit therethrough, and a plurality of floor tiles defining an upper surface of said floor construction; and a utility post for distributing utilities, and including a floor tile shaped for installation on said prefabricated floor construction and having at least one marginally positioned cutout thereof disposed above said raceway and communicating therewith; said utility post including at least one vertical raceway being in communication with one of said at least one marginally positioned cutout and a top located above the at least one vertical raceway.

2. The utility distribution system for open office plans of claim 1, wherein:

said cut outs in said floor tile is a notch in an edge of said floor tile.

3. The utility distribution system for open office plans of claim 2, further including:

at least one vertically positioned cover to enclose said race way.

4. The utility distribution system for open office plans of claim 3, wherein:

said vertically positioned cover includes a utility receptacle.

5. The utility distribution system for open office plans of claim 1, wherein:
said at least one vertical raceway is accessible from a vertical side of said floor mounted utility post.

6. The utility distribution system for open office plans of claim 1, wherein:
said at least one vertical raceway opens along at least a portion of a vertical side of said floor mounted utility post.

7. A utility distribution system for open office plans comprising:
a prefabricated floor construction adapted to be abuttingly supported on a building floor, and including a substantially hollow interior portion thereof defining at least one raceway to route at least one utility conduit therethrough, and a plurality of floor tiles defining an upper surface of said floor construction; and
a utility post for distributing utilities, and including a floor tile shaped for installation on said prefabricated floor construction and having at least one marginally positioned cutout thereof disposed above said raceway and communicating therewith; said utility post including at least one vertical raceway being in communication with one of said at least one marginally positioned cutout and a top located above the at least one vertical raceway;
said at least one marginally positioned cutout of said floor tile includes at least two marginally positioned cutouts positioned at separate edges of said floor tile;
said at least one vertical raceway includes a pair of vertical raceway channel members secured to said floor tile, each of said vertical raceway channel members being in communication with one of said cutouts;
said top is connected with upper portions of said raceway channel members; and said utility post further includes a door mounted to a first one of said raceways channel members, wherein said door, said top and said pair of vertical raceway channels in combination define a partial enclosure.

8. The utility distribution system for open office plans of claim 7, wherein:
at least one of said vertical raceway channel members has an S-shaped cross section defining two parallel channels, a first parallel channel facing an exterior of said post for external routing of utility conduits and a second parallel channel facing an interior of said post for internal routing of utility conduits.

9. The utility distribution system for open office plans of claim 7, further including:
at least one shelf mounted to said vertical raceway channel members.

10. The utility distribution system for open office plans of claim 9, wherein:
said raceways channel members define apertures for the routing of office utility conduits to an interior of said post.

11. The utility distribution system for open office plans of claim 7, further including:
a second door mounted to a second of said raceway channel members.

12. A utility distribution system for open office plans comprising:
a prefabricated floor construction adapted to be abuttingly supported on a building floor, and including a substantially hollow interior portion thereof defining at least one raceway to route at least one utility conduit therethrough, and a plurality of floor tiles defining an upper surface of said floor construction; and
a utility post for distributing utilities, and including a floor tile shaped for installation on said prefabricated floor construction and having at least one marginally positioned cutout thereof disposed above said raceway and communicating therewith; said utility post including at least one vertical raceway being in communication with one of said at least one marginally positioned cutout and a top located above the at least one vertical raceway;
said floor mounted utility post is positioned adjacent to and in combination with a second like floor mounted utility post, said utility posts forming a cabinet wherein said raceways form a back and sides of said cabinet and have a front thereof open for mounting of electrical equipment therein.

13. A utility distribution system for open office plans comprising:
a plurality of irregularly shaped floor pans adapted for abutting support directly on a floor surface in a mutually adjacent pattern, each floor pan including at least a portion of a first raceway in which first utilities can be routed and an exterior of said floor pan defining at least a portion of a second raceway in which second utilities can be routed;
a plurality of rigid cover plates supported on said floor pans in a mutually adjacent arrangement to define at least a portion of a continuous floor surface thereover;
a plurality of separator bridges;
each of said floor pan having at least one of said cover plates positioned thereover to enclosed the same;
each of said floor pan having one of said separator bridges positioned thereon, with sidewalls of said one separator bridge being disposed above, and oriented substantially perpendicular to sidewalls of said associated floor pan, whereby when said floor pans and separator bridges are positioned adjacent one another on the floor surface portions of adjacent floor pans abut end-to-end so that said first raceway is shielded from the floor surface and extends continuously through said floor construction, said adjacent floor pans define an open floor space therebetween which defines at least a portion of said second raceway and said separator bridges physically separate said second raceway from said first raceway to positively prevent the second utilities from coming into contact with the first utilities and thereby minimize interference therebetween; and
at least one utility post supported on said floor pans, said utility post including a base shaped for mounting on said floor pans, said base having at least two cutouts therein positioned at separate edges of said base; said utility post further including a pair of vertical raceways, each of said vertical raceways being in communication with one of said cutouts and a top connected with upper portions of said raceway channels; the utility post being configured such that the first utilities can be routed through a first one of said at least two cutouts and into a first one of said vertical raceways and the second utility can be routed through a second one of said at least two cutouts and into a second one of said vertical raceways.

14. The utility distribution system for open office plans of claim 13, wherein:

said cutouts are positioned at separate edges of said base;

said at least one vertical raceway includes a pair of vertical raceway channel members secured to said base, each of said vertical raceway channel members being in communication with one of said cutouts;

said top is connected with upper portions of said raceway channel members; and said utility post further includes a door mounted to a first one of said raceways channel members, wherein said door, said top and said pair of vertical raceway channels in combination define a partial enclosure.

15. The utility distribution system for open office plans of claim 14, wherein:

at least one of said vertical raceway channel members has an S-shaped cross section defining two parallel channels, a first parallel channel facing an exterior of said post for external routing of utility conduits and a second parallel channel facing an interior of said post for internal routing of utility conduits.

16. The utility distribution system for open office plans of claim 14, further including:

at least one shelf mounted to said vertical raceway channel members.

17. The utility distribution system for open office plans of claim 16, wherein:

said raceways channel members define apertures for the routing of office utility conduits to an interior of said post.

18. The utility distribution system for open office plans of claim 14, further including:

a second door mounted to a second of said raceway channel members.

19. The utility distribution system for open office plans of claim 13, wherein:

said cutouts in said base are notchs in edges of said base.

20. The utility distribution system for open office plans of claim 19, further including:

at least one vertically positioned cover to enclose said raceways.

21. The utility distribution system for open office plans of claim 20, wherein:

said vertically positioned covers includes a utility receptacle.

22. The utility distribution system for open office plans of claim 13, wherein:

said floor mounted utility post is positioned adjacent to and in combination with a second like floor mounted utility post, said utility posts forming a cabinet wherein said raceways form a back and sides of said cabinet and have a front thereof open for mounting of electrical equipment therein.

* * * * *

UNITED STATES PATENT AND TRADEMARK OFFICE
CERTIFICATE OF CORRECTION

PATENT NO. : 6,430,882 B1
DATED : August 13, 2002
INVENTOR(S) : Thomas G. Feldpausch et al.

It is certified that error appears in the above-identified patent and that said Letters Patent is hereby corrected as shown below:

Title page,
Item [75], Inventors, add -- Carl V. Forslund, III and Frederick S. Faiks -- as co-inventors.
Item [57], ABSTRACT,
Line 11, "cutouts" should be -- cutout --.

Column 2,
Line 61, "cutouts" should be -- cutout --.

Column 3,
Line 6, "pan" should be -- pans --.
Line 32, "raceway" should be -- raceways --.
Line 37, "fist" should be -- first --.

Column 4,
Line 29, "Fig. 3" should be -- Fig. 23 --.

Column 5,
Line 7, after "is" insert -- a --.

Column 6,
Line 15, after "top" insert -- of --.

Column 8,
Line 42, "detachably" should be -- detachable --.

Column 9,
Line 12, "comer" should be -- corner --.

Column 11,
Line 11, between "135" and "respectively" insert -- (a space) --.
Line 24, "walls 142-146" should be -- walls 142-145 --.

Column 12,
Line 32, "comer" should be -- corner --.

UNITED STATES PATENT AND TRADEMARK OFFICE
CERTIFICATE OF CORRECTION

PATENT NO. : 6,430,882 B1
DATED : August 13, 2002
INVENTOR(S) : Thomas G. Feldpausch et al.

It is certified that error appears in the above-identified patent and that said Letters Patent is hereby corrected as shown below:

Column 15,
Line 4, "comers" should be -- corners --.
Line 8, "raceways" should be -- raceway --.
Line 16, delete "and".
Line 16, insert -- , -- after "252" (first occurrence).
Line 16, insert -- , -- after "252" (second occurrence).

Column 16,
Line 24, after "can" delete "be".
Line 35, delete "id".
Line 57, "cut outs" should be -- cutouts --.
Line 62, "race way" should be -- raceway --.

Column 17,
Lines 36 and 54, "raceways" should be -- raceway --.

Column 18,
Line 33, "enclosed" should be -- enclose --.

Column 19,
Lines 9 and 25, "raceways" should be -- raceway --.

Column 20,
Line 14, "covers" should be -- cover --.

Signed and Sealed this

Fifteenth Day of April, 2003

JAMES E. ROGAN
*Director of the United States Patent and Trademark Office*